United States Patent [19]
Smith et al.

[11] 3,974,643
[45] Aug. 17, 1976

[54] COMBINED CYCLE ELECTRIC POWER PLANT AND A GAS TURBINE HAVING IMPROVED OUTLET TEMPERATURE LIMIT CONTROL

[75] Inventors: Jack R. Smith, Pittsburgh; Terry J. Reed, North Huntingdon, both of Pa.

[73] Assignee: Westinghouse Electric Corporation, Pittsburgh, Pa.

[22] Filed: Aug. 8, 1974

[21] Appl. No.: 495,694

[52] U.S. Cl. .................... 60/39.18 B; 60/39.28 R
[51] Int. Cl.² ............................................ F02C 7/02
[58] Field of Search ............... 60/39.28 R, 39.14; 290/40 A

[56] References Cited
UNITED STATES PATENTS

| | | | |
|---|---|---|---|
| 3,255,586 | 6/1966 | Hennig | 60/39.28 R |
| 3,382,671 | 5/1968 | Ehni | 60/39.28 R |
| 3,421,317 | 1/1969 | Bedford | 60/39.28 R |
| 3,422,800 | 1/1969 | LaHaye | 60/39.28 R |
| 3,469,395 | 9/1969 | Spitsbergen | 60/39.28 R |
| 3,691,759 | 9/1972 | Scheerer | 60/39.14 |
| 3,834,361 | 9/1974 | Keely | 60/39.28 R |
| 3,854,287 | 12/1974 | Rembold | 60/39.28 T |

Primary Examiner—Clarence R. Gordon
Attorney, Agent, or Firm—E. F. Possessky

[57] ABSTRACT

A combined cycle electric power plant includes gas and steam turbines and steam generators and a digital-/analog control system. A backup control is included for each of the gas turbines with an outlet or preferably blade path temperature limit control which prevents the operator from causing the turbine to operate above a temperature limit reference. The temperature limit control further restricts the rate at which the operator can move the gas turbine operating or load level toward the temperature limit value. When the turbine is operating at a load below the temperature limit value, the operator can freely move the fuel reference until the blade path temperature approaches the temperature limit value.

23 Claims, 19 Drawing Figures

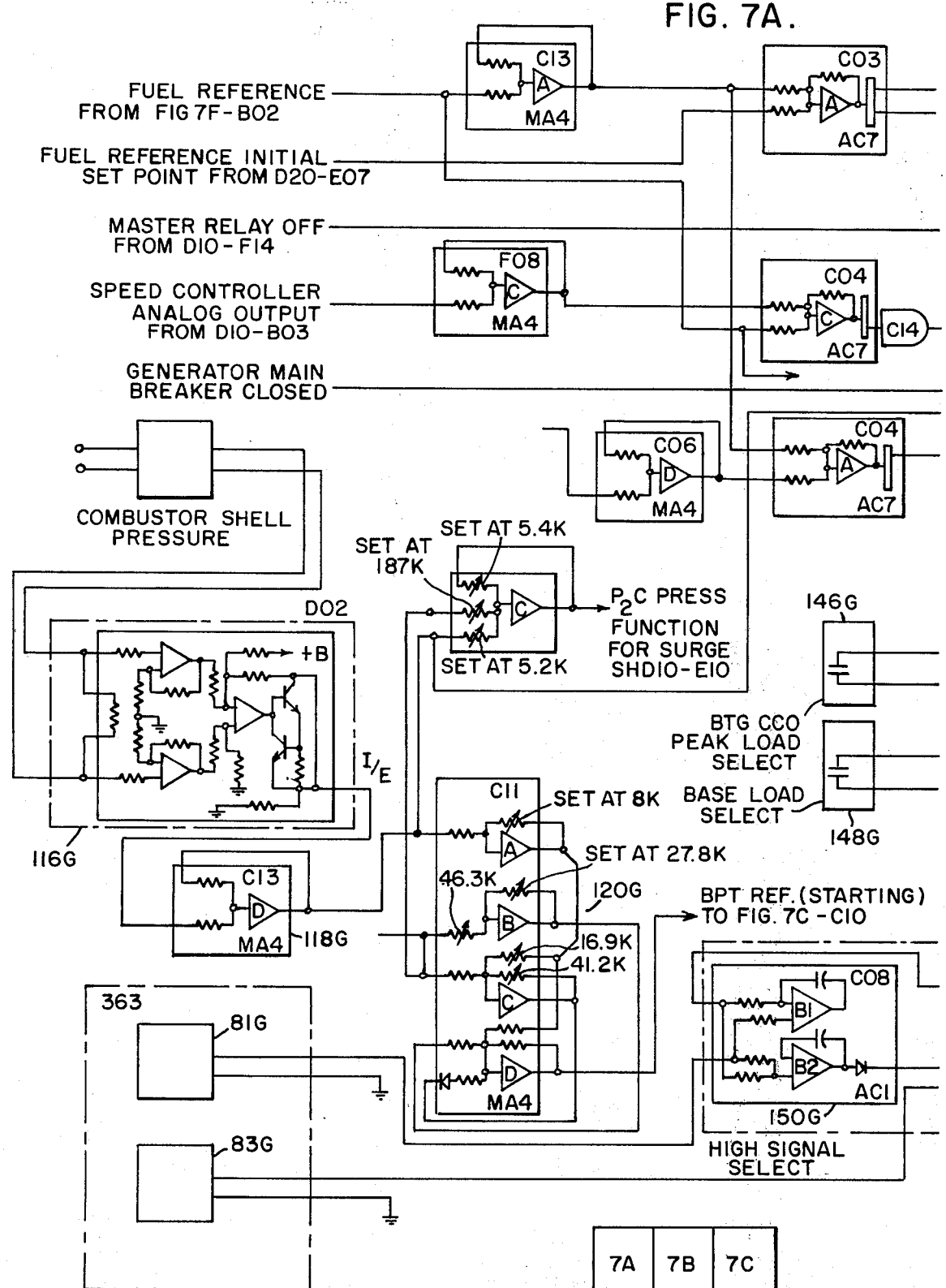

COMBINED CYCLE ELECTRIC POWER PLANT AND A GAS TURBINE HAVING IMPROVED OUTLET TEMPERATURE LIMIT CONTROL

CROSS-REFERENCE TO RELATED APPLICATIONS

Reference is made to the following patent applications:

1. Ser. No. 399,790, filed on Sept. 21, 1973 by L. F. Martz, R. W. Kiscaden and R. Uram, entitled "An Improved Gas Turbine And Steam Turbine Combined Cycle Electric Power Generating Plant Having A Coordinated And Hybridized Control System And An Improved Factory Based Method For Making And Testing Combined Cycle And Other Power Plants And Control Systems Therefor", assigned to the present assignee and hereby incorporated by reference.

2. Ser. No. 319,114, filed by T. Giras and J. Reuther on Dec. 29, 1972 as a continuation of an earlier filed application Ser. No. 082,470, entitled "An Improved System And Method For Operating Industrial Gas Turbine Apparatus And Gas Turbine Electric Power Plants Preferably With A Digital Computer Control System" and assigned to the present assignee, and related cases referred to therein.

3. Ser. No. 371,625, filed on June 20, 1973 by R. Yannone and R. A. Shields, entitled "Gas Turbine Power Plant Control Apparatus Having A Multiple Backup Control System", and assigned to the present assignee, and related cases referred to therein.

4. Ser. No. 495,765, filed concurrently herewith by Lyle F. Martz and Richard J. Plotnick, entitled "Combined Cycle Electric Power Plant Having A Control System Which Enables Dry Steam Generator Operation During Gas Turbine Operation", assigned to the present assignee and hereby incorporated by reference.

BACKGROUND OF THE INVENTION

The present invention relates to combined cycle electric power plants and more particularly to improved gas turbine temperature limit controls especially useful in the operation of gas turbines in combined cycle electric power plants.

In the generation of electric power with the use of gas turbines as prime movers or suppliers of heat energy, it is desirable to provide automatic startup and loading control with manual backup control. An outlet temperature control loop is one of the loops normally included in an automatic gas turbine control to prevent the gas turbine from operating at excessive temperatures which would otherwise cause excessive metal damage. Such a loop typically controls the turbine outlet temperature to the temperature limit value as a setpoint once the loading on the turbine causes the outlet temperature limit value to be reached under the existing ambient conditions. Although the same temperature control loop or a similar one could be employed in manual backup control, it is often desirable for reasons of economy and operating flexibility to provide a reduced level of automation for the backup mode outlet temperature control without losing the basic turbine protection intended to be provided. The outlet temperature control may be based on exhaust path temperature signals or blade path temperature signals or some combination of the two. The term outlet temperature is herein intended to include blade path temperature and exhaust temperature.

In combined cycle plants, it is especially desirable that the outlet temperature control be provided during automatic and manual control in such a way that the rate and amplitude of outlet temperature cycling be restricted to avoid excessive and unnecessary inlet gas temperature cycles on the heat recovery steam generator apparatus and accordingly to avoid excessive and unnecessary steam temperature (or condition) cycles at the inlet to the steam turbine apparatus. Further it is desirable expecially in combined cycle plants that temperature limit action be provided in such a way that manual turbine load control is made possible. Therefore, in providing manual gas turbine backup control for gas turbines in combined cycle plants which are normally attended by an operator, it is desirable that the gas turbine outlet temperature be efficiently and reliably limited with a relatively reduced level of automation, consistently with a provision for manual load control and avoidance of excessive rates and magnitudes of outlet temperature cycling about the limit outlet temperature value. In stand-alone gas turbine electric power plants which are often unattended, a similar kind of manual mode outlet temperature backup control can be desirable.

In the prior art, the previously referenced patent application Ser. No. 319,114 discloses an automatic digital computer control system for gas turbines in which some degree of automatic load control is provided and in which setpoint exhaust and blade path temperature limit control is provided with a temperature anticipation function which in effect limits the rate at which fuel flow increases are made as the exhaust or blade path temperature limit is approached. Manual backup control is not disclosed in that application, and accordingly the relationship of outlet temperature limit control to load control in automatic and manual modes of operation is not addressed therein. A manual backup control usable with a digital computer control for gas turbines like the one disclosed in Ser. No. 319,114 is disclosed in another copending patent application Ser. No. 476,182 entitled "Local Maintenance Controller For Gas Turbine Power Plants Having A Primary Control System" filed by R. A. Yannone et al on June 4, 1974, and assigned to the present assignee. In that patent application, outlet temperature limit control in the manual backup controller is provided with integrator setpoint control and low select action.

Among various other prior art schemes for placing limit control on gas turbine outlet temperature in electric power plants, a control system which includes both electronic and pneumatic subsystems is disclosed in a copending patent application Ser. No. 371,621 entitled "Gas Turbine Power Plant Control Apparatus Including Automatic Load Pickup", filed by R. A. Yannone and J. J. Shields on June 20, 1973, and assigned to the present assignee. In that electropneumatic control sustem, outlet temperature limit is controlled by a temperature setpoint control in the backup and primary control modes. In early gas turbine control systems, manual speed/load controls have been provided with temperature limit control but such systems were relatively simple and had little or no automation.

The description of prior art herein is made on good faith and no representation is made that any prior art considered is the best pertaining prior art not that the interpretation placed on it is unrebuttable.

SUMMARY OF THE INVENTION

A combined cycle electric power plant includes turbine and generator apparatus and a control system having a gas turbine backup control provided with a turbine outlet temperature limit control loop. To prevent the application of excessive temperature values and temperature cycles across the plant boiler apparatus and the plant steam turbine, the manual control includes a speed/load control which controls fuel flow to satisfy startup and loading demands, and the temperature limit loop restricts the gas turbine operation in the manuel mode to a predetermined temperature limit reference value and preferably further restricts the rate at which the value can be approached.

BRIEF DESCRIPTION OF THE DRAWINGS

FIGS. 6A through 6F show a more detailed functional diagram of the temperature limit control and FIG. 6G shows how these Figures are tied together;

FIGS. 7A through 7F show circuitry which can be employed to embody various functional blocks in FIGS. 6A-6F and FIG. 7G shows how these Figures are tied together.

DESCRIPTION OF THE PREFERRED EMDOBIMENT

A. General Plant Description

Figure 1:
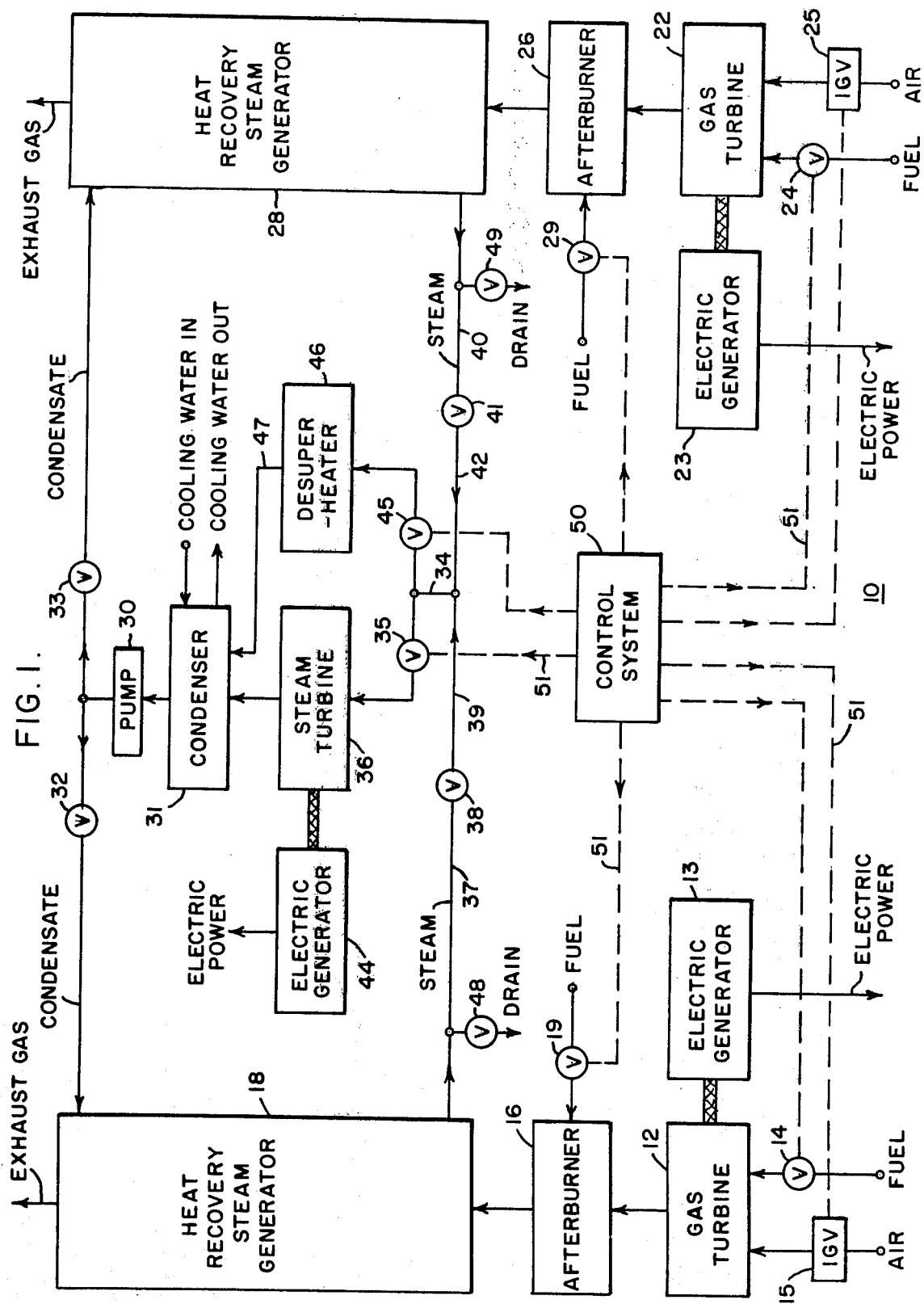
FIG. 1 shows a schematic view of a combined cycle electric power plant in which there is employed a gas turbine in accordance with the principles of the invention.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 includes a first gas turbine 12 (sometimes referred to as "gas turbine No. 1") which drives a first electric 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through an afterburner 16 and a heat recovery steam generator 18 and is thereafter exhausted into the atmosphere.

Heat recovery steam generator 18 (sometimes referred to as "heat recovery steam generator No. 1") includes therein various sets of boiler tubes which are heated to a relatively high temperature by the gas turbine exhaust gas passing through the steam generator 18. Afterburner 16 includes a burner mechanism for further increasing the temperature of the gas turbine exhaust gas before it enters the steam generator 18. Fuel is supplied to the burner mechanism in the afterburner 16 by way of a fuel control valve or throttle valve 19. The primary heat source for the steam generator 18 is the gas turbine 12, the afterburner 16 being in the nature of a supplemental heat source for providing supplemental heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as "gas turbine No. 2") which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 is burned in the gas turbine 22 and the resulting high temperature exhaust gas is passed through an afterburner 26 and a heat recovery steam generator 28 and is thereafter exhausted into the atmosphere.

Heat recovery steam generator 28 (sometimes referred to as "heat recovery steam generator No. 2") includes various sets of boiler tubes which are heated to a relatively high temperature by the gas turbine exhaust gas passing through the steam generator 28. Afterburner 26 includes a burner mechanism for further increasing the temperature of the gas turbine exhaust gas before it enters the steam generator 28. Fuel is supplied to the burner mechanism in the afterburner 26 by way of a fuel control valve or throttle valve 29. The primary heat source for the steam generator 28 is the gas turbine 22, the afterburner 26 being in the nature of a supplemental heat source for providing supplemental heating when needed. In terms of typical total fuel consumption, approximately 80% of the fuel is used in the gas turbine 22 and 20% is used in the afterburner 26.

A condensate pump 30 pumps water of condensate from a steam condenser 31 to both of the steam generators 18 and 28, the condensate flowing to the first steam generator 18 by way of a condensate flow control valve 32 and to the second steam generator 28 by way of a condensate flow control valve 33. Such condensate flows through the boiler tubes in each of the steam generators 18 and 28 and is converted into superheated steam. The superheated steam from both of the steam generators 18 and 28 is supplied by way of a common header or steam pipe 34 and a steam throttle valve or control valve 35 to a steam turbine 36 for purposes of driving such steam turbine 36. The steam from the first steam generator 18 flows to the header 34 by way of a steam pipe 37, an isolation valve 38 and a steam pipe 39, while steam from the second steam generator 28 flows to the header 34 by way of a steam pipe 40, an isolation valve 41 and a steam pipe 42.

The spent steam leaving steam turbine 36 is passed to the condenser 31 wherein it is condensed or converted back into condensate. Such condensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. The control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, among other things, automatically coordinates the settings of the fuel valves 14, 19, 24 and 29, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from hot standby condition in approximately 60 minutes time by having the plant operator simply dial in the desired load setting and push a master plant start button.

As an indication of the flexibility and reliability of the power generating plant 10, it is noted that the plant 10 can be operated in any one of the following configurations: (1) using one steam turbine and two gas turbines; (2) using one steam turbine and one gas turbine; (3) using two gas turbines only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 and 22. When one of the gas turbines, for example the gas turbine 12, is not being used or is shut down for maintenance purposes, then its associated steam generator 18 can be removed from the system by closing its condensate flow valve 32 and its steam isolation valve 38. When, on the other hand, the steam turbine 36 is not being used or is shut down for maintenance purposes, the steam generated by the steam generators 18 and 28 can be bypassed to the condenser 31 by way of steam bypass valve 45 and the desuperheater 46. As an alternative, when the steam turbine 36 is not being used, either one or both of the steam generators 18 and 28 can be drained and vented by the appropriate setting of condensate valves 32 and 33, steam isolation valves 38 and 41 and drain valves 48 and 49. In other words, each of the steam generators 18 and 28 is constructed so that its respective gas turbine can be operated with the steam generator in a dry condition.

The combined cycle plant 10 affords a high degree of reliability in that failure of any one of the major apparatus components will not reduce total plant power generation capacity by more than 50%. In this regard and by way of example only, a combined cycle plant 10 has been developed having a nominal maximum power generating capacity of 260 megawatts. In such plant, each of the gas turbines 12 and 22 is capable of producing a maximum of approximately 80 megawatts of electrical powder under ISO conditions (59°Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%.

It is noted in passing that the functional block diagram of FIG. 1 has been simplified in some respects relative to the actual plant apparatus to be described hereinafter, this simplification being made to facilitate an initial overall understanding of the combined cycle plant 10. A major simplification in FIG. 1 concerns the fuel valves 14, 19, 24, and 29. As will be seen in the actual embodiment of the combined cycle plant described herein, provision is made for operating the gas turbines 12 and 22 and the afterburners 16 and 26 on either of two different kinds of fuel, namely, either natural gas or distillate type fuel oil. As a consequence, each of the gas turbines 12 and 22 and each of the afterburners 16 and 26 is actually provided with two fuel throttle valves, one for natural gas and the other for fuel oil. Also, various other valves and devices employed in the actual fuel supply systems have been omitted from FIG. 1 for the sake of simplicity. Other simplifications employed in FIG. 1 are of a similar character.

B. Gas Turbine Mechanical Structure

Figure 2A:
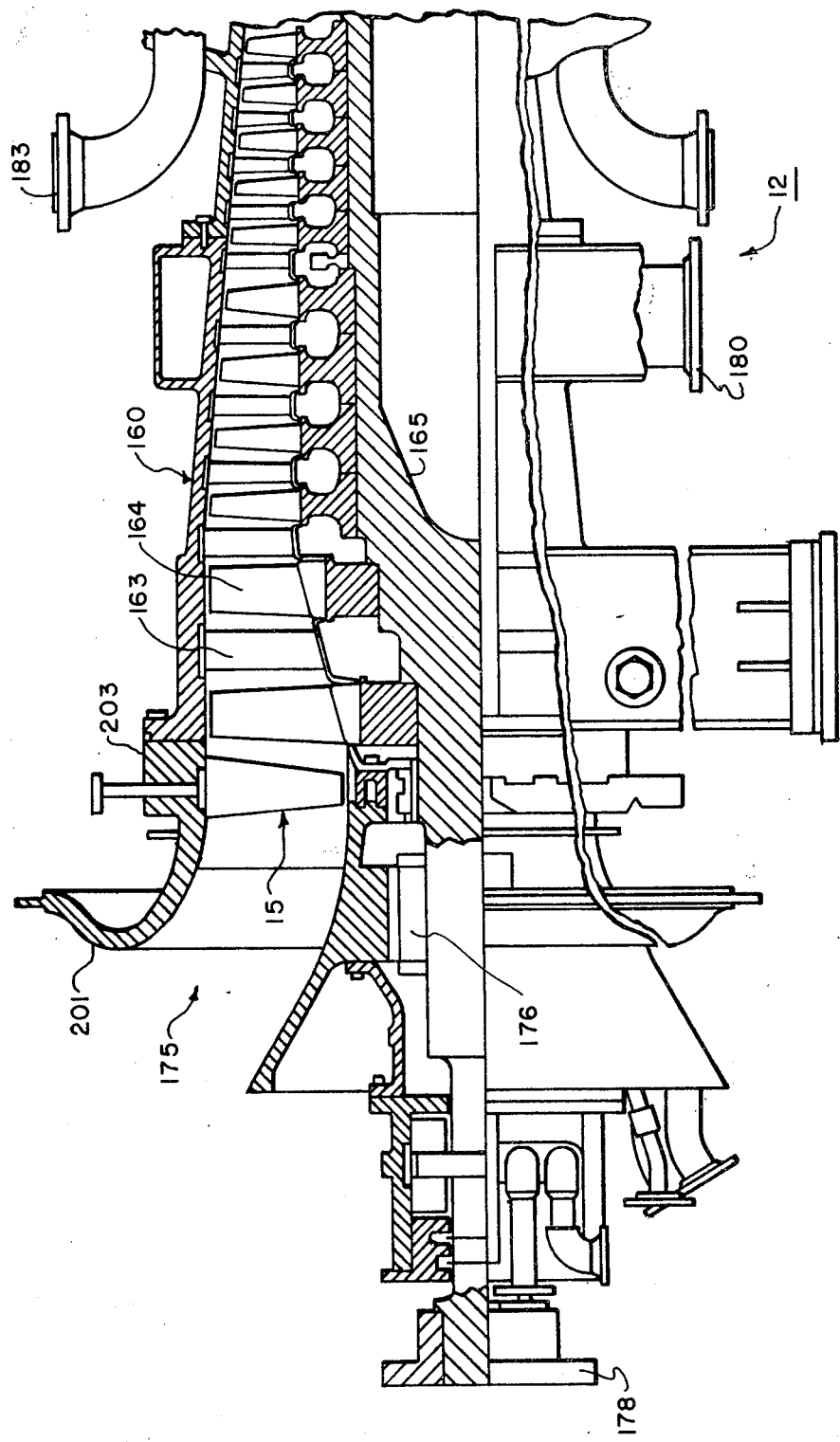
FIGS. 2A and 2B illustrate a gas turbine structure which can be employed in the plant of FIG. 1.
Figure 2B:
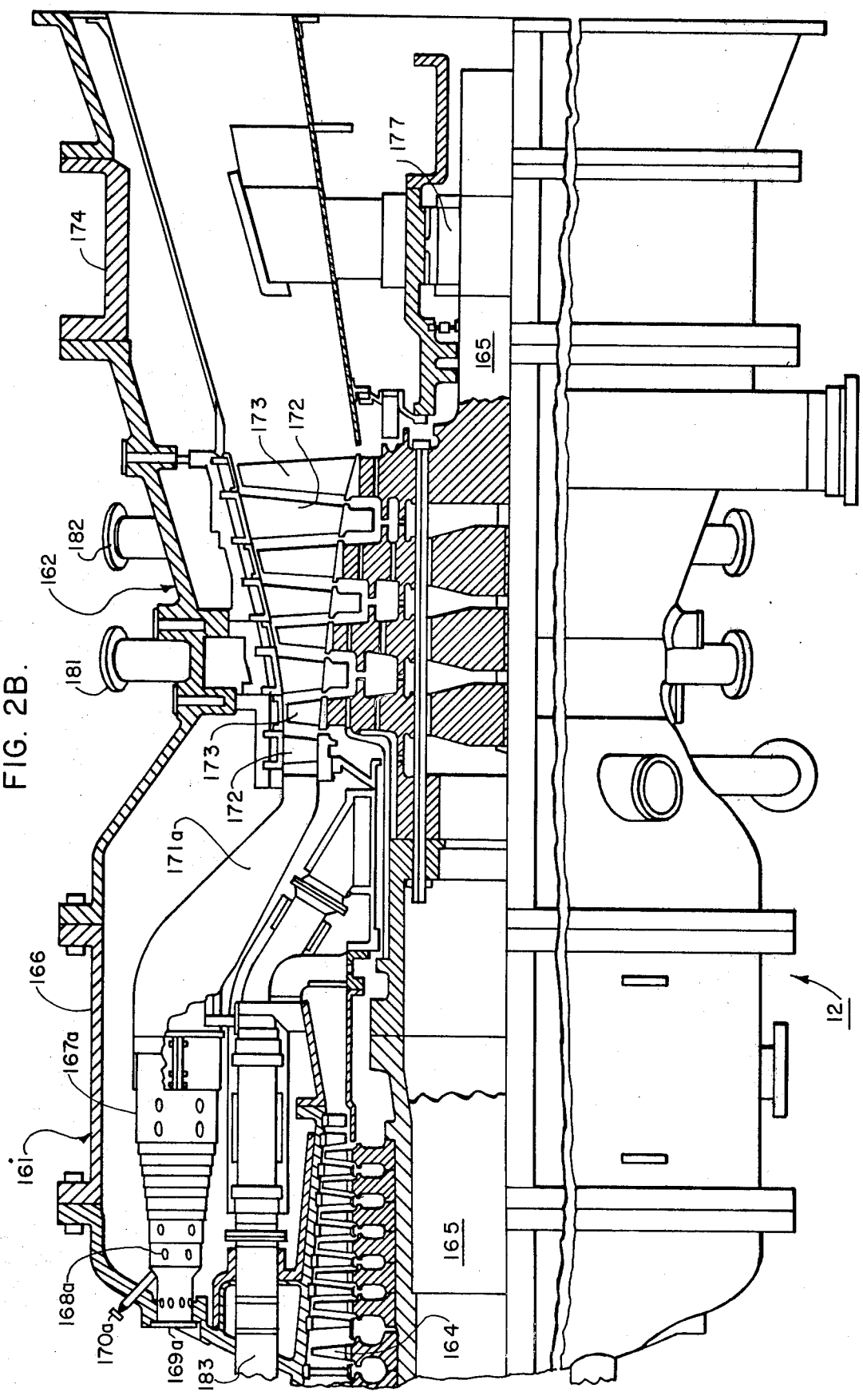

Referring now to FIGS. 2A and 2B, there is shown a longitudinal, partially cross-sectional, elevational view of the No. 1 gas turbine 12. FIG. 2A shows the left-hand half of the view of FIG. 2B shows the right-hand half of the view. The No. 2 gas turbine 22 is of this same construction and whatever is said concerning the construction of the No. 1 gas turbine 12 also applies to the No. 2 gas turbine 22. With this in mind, the gas turbine 12 is a W-501 gas turbine manufactured by Westinghouse Electric Corporation, Gas Turbine Systems Division, Lester, Pennsylvania. It is of the simple open cycle type and employs a single-shaft two-bearing construction in which no bearings are located in a high pressure, high temperature zone. It is constructed for operation at a rated speed of 3,600 rpm and is capable of driving an electric generator for producing in excess of 80 megawatts of electrical power. It includes an axial flow air compressor section 160, a combustion section 161 and a turbine section 162. The compressor section or compressor 160 is comprised of interspersed sets of stationary blades 163 and rotary blades 164, the latter being located on a rotor structure 165 which extends substantially the entire length of the gas turbine 12.

The combustion section 161 includes a combustor housing or combustor shell 166 which receives the compressed air from the compressor 160. Located in the combustor shell 166 is a set of 16 combustion chambers or combustors, one of which is indicated at 167a. These combustors 167a–167p are arranged in an evenly spaced concentric manner around the longitudinal center axis of the gas turbine 12. Considering in detail only the combustor 167a, compressed air enters the interior thereof by multiple ports 168a. Fuel enters the combustor 167a by way of a fuel nozzle 169a, a spark plug 170a serving to provide for the initial ignition of the fuel. This fuel is burned in the combustor 167a and the resulting high temperature, high pressure gas is supplied by way of a combustor outlet duct 171a to the inlet of the turbine section 162.

The turbine section 162 is a four stage turbine having interspersed sets of stationary blades 172 and rotary blades 173, the latter being located on the rotor structure 165. The high temperature high pressure gas from all of the combustors 167a–167p enters the turbine section 162 and expands through the turbine blades 172 and 173 to cause rotation of the rotary blades 173 and thereby drive the rotary blades 164 of the compressor 160 on the same rotor structure 165. The hot exhaust gas leaving the turbine section 162 exhausts axially by way of an exhaust duct 174 from whence it flows into the inlet duct for the heat recovery steam generator 18.

The variable inlet guide vane mechanism 15 is located just inside the air intake structure 175 of the compressor section 160, just ahead of the first set of compressor blades 163 and 164. The inlet guide vanes 15 are used to adjust the compressor air flow during the starting cycle and to increase part load efficiency.

The two bearings which support the single rotor structure 165 of the gas turbine 12 are indicated at 176 and 177. As seen, these bearings 176 and 177 are located outside of any high pressure high temperature zone. The electric generator 13 is coupled to the cold or compressor end 178 of the rotor structure 165 to avoid potential misalignment problems. Some air is removed from the compressor 160 by way of outlet 180, externally cooled and filtered by an air cooler and returned to the turbine section 162 to cool the first two sets of stationary blades 172 and the first set of rotary blades 173. The cooling air for the stationary blades 172 enters through inlets 181 and 182, while the cooling air for the first set of rotary blades 173 enters via inlet 183.

For more detail on the structure of other apparatus in the plant 10, reference is made to Ser. No. 495,765.

C. Plant Control System

The plant control system 50 is organized to operate the plant equipment safely through startup and loading with high reliability so that the plant is highly and quickly available to meet power demanded from it. To achieve this purpose, the plant control system is preferably embodied in digital/analog hybrid form, and the digital/analog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the follow mode, the steam turbine produces power at a level dependent on the steam conditions generated by the heat inputs to the steam generators.

Figure 3:
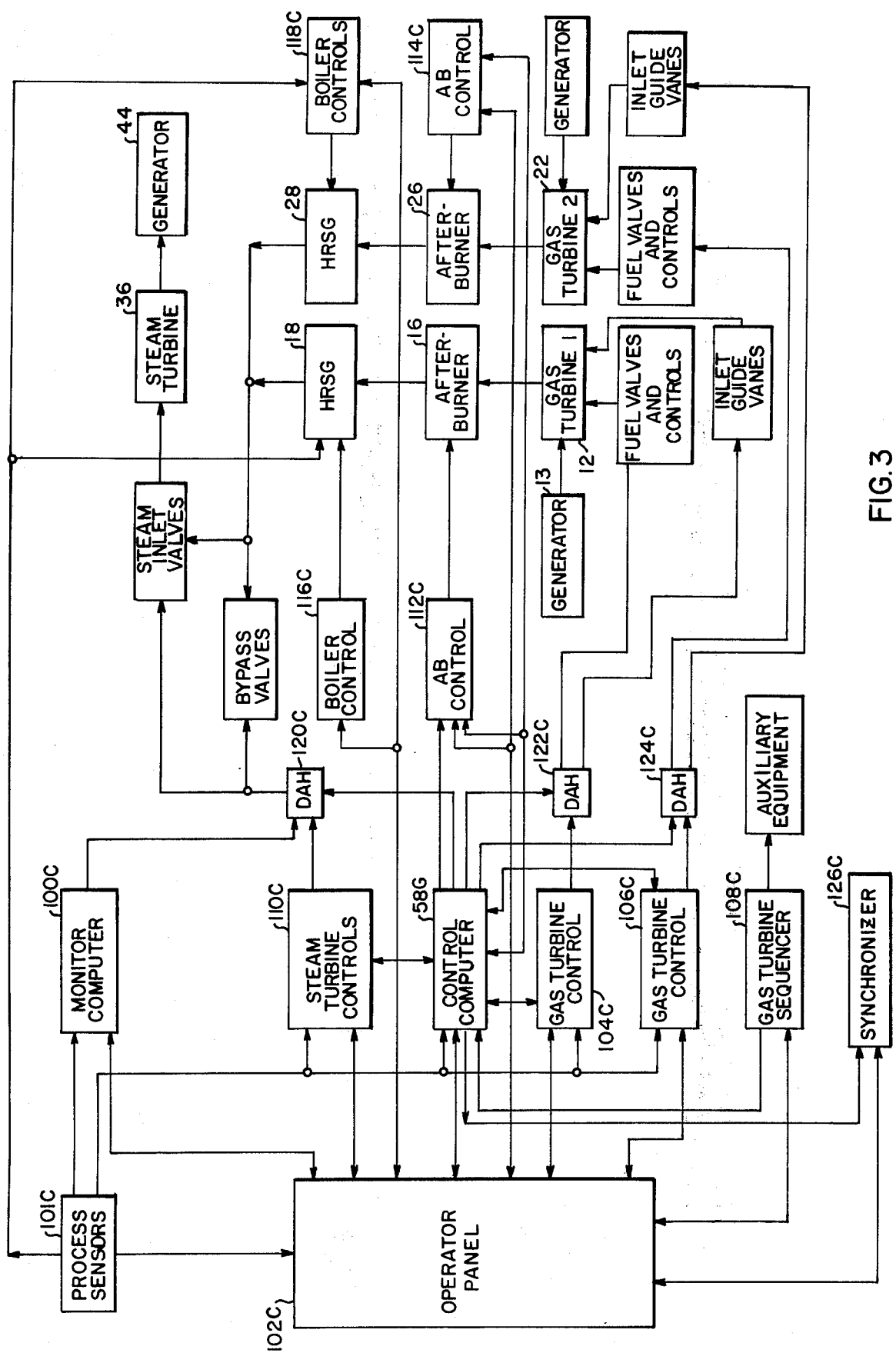
FIG. 3 shows a schematic view of a control system arranged to operate the plant of FIG. 1 in accordance with the principles of the invention.

As shown in FIG. 3, the control system 50 includes a digital control computer 58G, a digital monitor computer 100C and various analog controls for operating the plant equipment in response to process sensors 101C while achieving the described objectives. In this instance an automatic startup control for the steam turbine 36 is largely embodied in the monitor computer 100C. An operator panel 102C provides numerous pushbutton switches and various displays which make it possible for the plant to be operated by a single person. The pushbutton switches provide for numerous operator control actions including plane and turbine mode selections and setpoint selections.

In the operator analog or manual mode of operation, the operator sets the fuel level for the gas turbines 12 and 22 and the afterburners 16 and 26 through gas turbine controls 104C and 106C during loading, but an analog startup control included in each of the gas turbine controls 104C and 106C automatically schedules fuel during gas turbine startups. In addition, sequencers 108C start and stop auxiliary equipment associated with the gas turbines during gas turbine startups. The turbine bypass steam flow and the turbine inlet steam flow are controlled by operator valve positioning implemented by a steam turbine control 110C during steam turbine startup and loading in the operator analog mode. Certain automatic control functions are performed for the steam and gas turbines by the controls 104C, 106C, and 110C in the operator analog mode.

In the operator automatic mode, the computers 58G and 100C perform various control functions which provide for automatic startup and automatic loading of the gas and steam turbines under the direction of the operator on a turbine-by-turbine basis. Afterburner controls 112C and 114C and boiler controls 116C and 118C operate under operator setpoint control during the operator analog and operator automatic modes. Respective digital/analog hybrid circuits 120C, 122C and 124C interface the digital and analog controls.

Under plant coordinated control, the computer 58G generally directs the plant operation through startup, synchronization and loading to produce the plant power demand. The extend of coordinated plant control is dependent on the existing plant configuration, i.e. according to the availability of apparatus for operation or for coordinated operation. For example, if a gas turbine is shut down, it is excluded from coordination. Similarly, if the gas turbine has been excluded from coordinated control by the operator, the computer 58G will operate accordingly. In all coordinated control cases, the boiler controls 116C and 118C function separately, .i.e. they react automatically to operator setpoints and signals generated by the process sensors 101C to control the steam generators according to plant conditions produced by coordinated turbine and afterburner operations. The computer 58G provides setpoint signals for the afterburners in the coordinated control mode but not in the operator automatic mode. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions applied to the synchronizer inputs and outputs.

Once the plant reaches hot standby and either gas turbine or both gas turbines have been started, the steam turbine can be started when minimum steam supple conditions have been reached. Thereafter, the turbines are accelerated to synchronous speed, the generators are synchronized and the fuel and steam valves are positioned to operate the turbines at the demand load levels. The manner in which the control system 50 is configured and the manner in which it functions throughout startup and loading depends on the selected plant mode and the selected or forced plant configuration and the real time process behavior.

D. Blade Path Temperature Limit Control For Backup Mode

Figure 4:
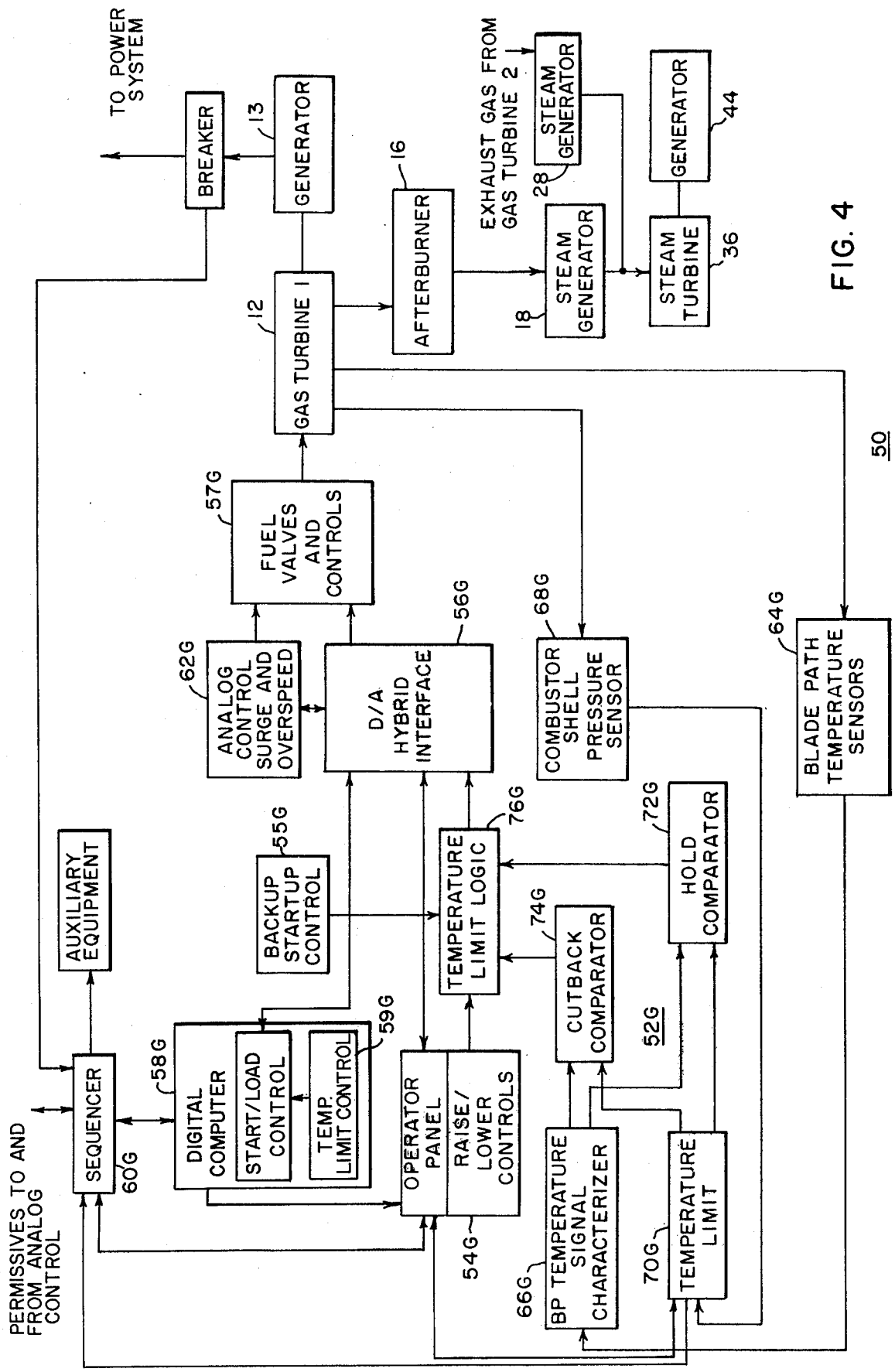
FIG. 4 shows a schematic diagram of the plant control system with elements of an outlet or blade path temperature limit loop illustrated to indicate more particularly the preferred manner of embodying the invention.

As shown in FIG. 4, the preferred embodiment comprises a gas turbine outlet temperature limit control subsystem 52G which is included in the plant control system 50 preferably to limit blade path gas temperature reliably and efficiently during the backup or manual mode of gas turbine operation. The rate and magnitude of blade path gas temperature cycling is limited economically and effectively by on-off type of control as the gas temperature limit is approached under operator control. Since blade path temperature setpoint control is not employed, the operator has extended flexibility and can freely make changes in the gas turbine power generation level until the temperature limit value is approached.

The manual/automatic status of the plant control system 50 is fixed by operator selection at an operator panel 54G or by a computer rejection or failure to manual. A digital/analog hybrid interface 56G includes manual/automatic logic circuitry to detect when the gas turbine 12 is to be on manual control and to make bumpless switching operations which implement the applicable control mode. By "manual mode or control" it is meant to refer herein to a backup mode or control in which both manual and automatic control actions can occur.

In automatic control, a programmed digital control computer 58G generates a fuel reference from the hybrid in the coordinated and the operator automatic modes to provide MW load control and to provide speed control during automatic startup. In the operator analog or manual mode, the operator controls the turbine loading operation by generating a fuel reference from the hybrid and a startup control 55G generates a fuel reference from the hybrid during startup.

The computer also initiates turbine startup by a sequencing system 60G under coordinated control. Generally, the sequencer 60G sequences the gas turbine 12 through the startup process by starting and stopping auxiliary equipment when sequencing permissives are generated, and it trips the turbine if certain conditions develop. Further, the sequencer 60G generates logicals for the turbine controls, i.e. a master relay on signal, a fuel on signal, a breaker status signal, a fuel select and transfer signal, and a flame on signal.

An analog control 62G, including overspeed and surge limit controls, functions during the coordinated and operator automatic modes of operation as well as the operator analog and manual modes of operation. The temperature limit control subsystem 52G functions during the manual and operator analog modes only, and it is transferred to a standby mode, during automatic operation. The computer 58G provides a temperature limit controller 59G which acts as an override or a hold on the computer startup and load controls during its programmed operation in the automatic mode as disclosed more fully in a copending and coassigned patent application Ser. No. 495,765 entitled "A smooth And Highly Responsive Gas Turbine Temperature Limit Control Especially Useful In Combined Cycle Electric Power Plants", and filed by J. M. Anderson, K. R. Wescott, M. M. Hobbs, and R. W. Kiscaden, concurrently herewith and hereby incorporated by reference.

The hybrid interface 56G generates a fuel reference for application to fuel valve control circuitry in block 57G. The hybrid output fuel reference is either a value which results from computer control or a value which results from operator control from the operator panel, subject to limit action. Transfer between automatic and manual fuel references is made bumpless by the functioning of the hybrid interface 56G in conjunction with the automatic and backup controls.

Gas turbine outlet temperature limiting operation may be reached during startup of the gas turbine 12 or after it has been started and is operating in the load mode to produce electric power through the generator 13 and to supply heat to the steam generator 18. In the manual load mode, the operator can raise or lower the turbine fuel reference freely unless the blade path gas temperature limit is approached.

To detect exhaust temperature limit conditions, blade path temperature sensors 64G generate a temperature signal which is characterized by block 66G and a combustor shell pressure sensor 68G generates a pressure signal from which there is generated a temperature limit signal by block 70G. A hold comparator 72G relates one feedback characterized temperature signal and the temperature limit and bumplessly forces a hold on the fuel reference if the limit is exceeded by the temperature signal. Further, a cutback comparator 74G compares another differently characterized temperature feedback temperature signal and the temperature limit signal bumplessly to force a decrease in the manually controlled fuel reference when the blade path temperature is exceeded or when it is being approached at a rate that may cause it to be exceeded with overshoot. Temperature limit logic 76G restricts any operator entered fuel reference raise demand according to the operation of the hold and cutback comparators 72G and 74G.

SYSTEM FUNCTIONS

Figure 5A:
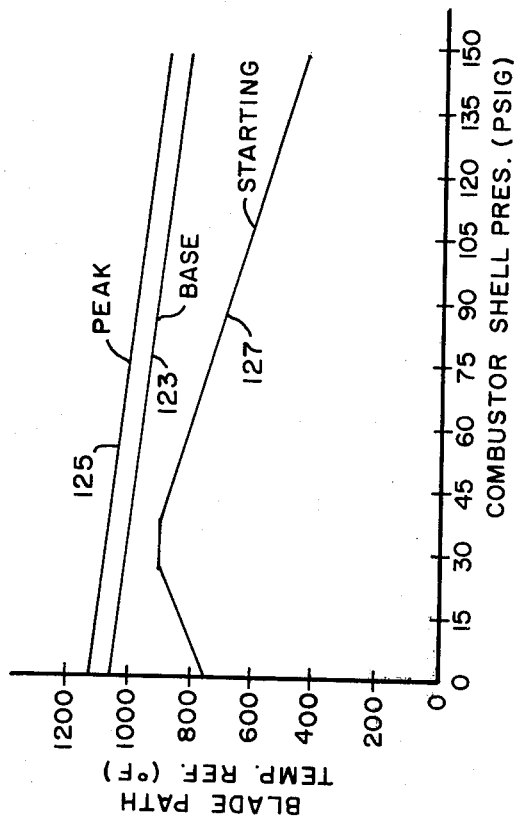
FIG. 5A shows a plot of the blade path temperature limit reference versus combustor shell pressure for three different turbine operating modes.
Figure 5B:
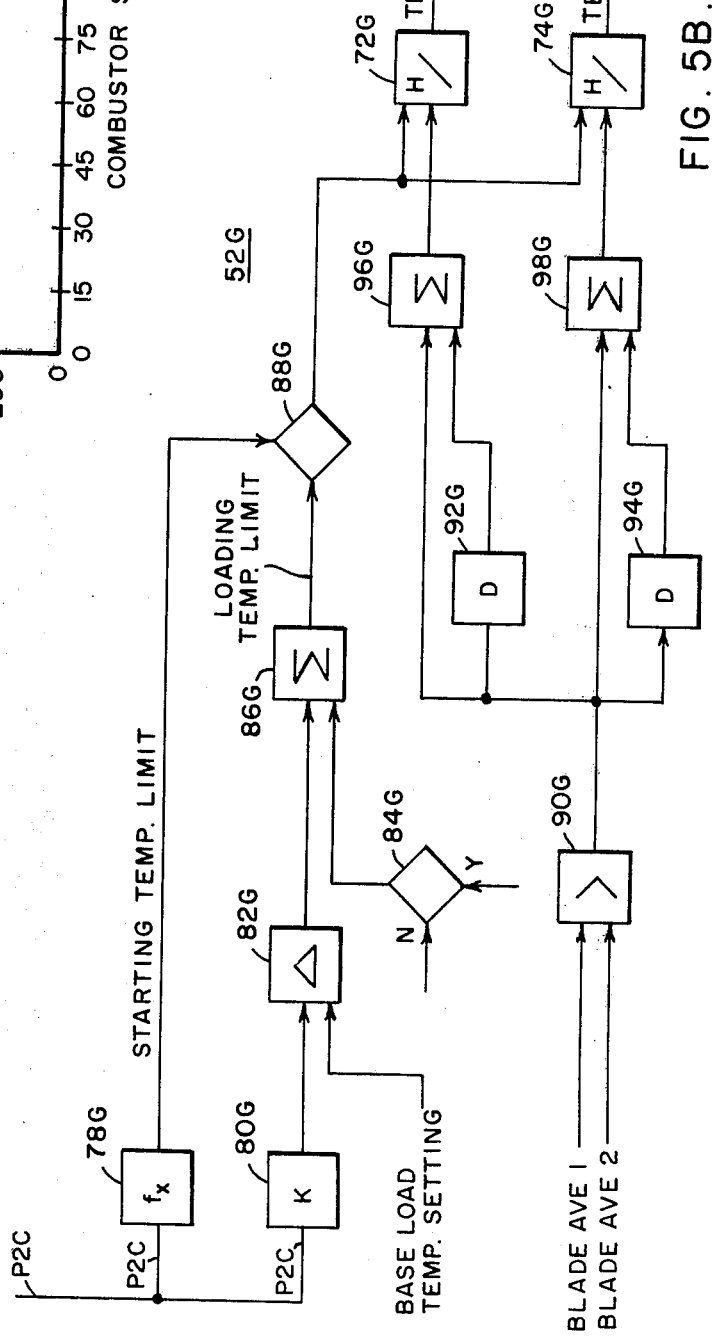
FIG. 5B shows a functional diagram of a temperature limit control arranged in accordance with the invention.

Portions of the temperature limit control subsystem 52G are shown in somewhat greater functional detail in FIG. 5B. The combustor shell pressure signal is applied to a function generator 78G to produce a temperature limit signal during startup and it is applied to a proportional function block 80G during load operation. On base load operation, a difference block 82G generates the base load temperature limit signal. On peak operation, block 84G generates a signal which is added to the base load temperature limit signal by a summing or load function generator block 86G to produce higher temperature limit action during peak operation. Block 88G transmits the applicable limit signal, i.e. the startup or the load temperature limit signal, to the hold and cutback comparators 72G and 74G.

As shown in FIG. 5A, the load temperature limit reference generator 86G generates an output corresponding to a linear characterization 123 for base load generation and a linear characterization 125 for peak load operation. The startup function generator 78G generates a characterization 127 comprising three linear sections having different slopes and approximating a nonlinear function. The basic purpose of the temperature limit control is to protect the gas turbine against excessive turbine inlet temperatures under varying ambient conditions. Since it is difficult to measure turbine inlet temperature, the turbine outlet or blade path temperature is measured and compared to a blade path temperature limit reference obtained from the characterization 123, 125 or 127. In turn, the characterizations 123, 125 and 127 are each calculated from a preselected turbine inlet temperature limit and a known function of turbine temperature drop versus combustor shell pressure. Thus, at any particular pressure, each of the characterizations 123, 125 and 127 define a blade path temperature limit which implies existence of the preselected turbine inlet temperature limit. In the present case, base load operation is automatically selected on breaker closure, and peak load operation is obtained by operation selection.

A plurality of blade path temperature sensors generate temperature signals which are divided into two groups and respectively averaged. Block 90G selects the higher average temperature signal for use in the temperature limit control loop. Thus, the temperature signal is applied to rate blocks 92G and 94G which generate different rate signals on the basis of different derivative functions. Further, the derivative functions for each rate block 92G or 94G is automatically varied as a function of gas turbine status. Thus, different rates are used in each block for starting as compared to loading.

A hold summer 96G adds the temperature signal and the rate signal from the block 92G. A cutback summer 98G adds the temperature signal and the rate signal from the block 94G. The hold derivative function in the block 92G has a somewhat higher derivative value than that associated with the cutback block 94G so that the hold control acts more quickly as the temperature limit is being approached at a fast rate. Thus, as the temperature limit is being approached, hold or cutback action occurs according to the approach rate.

In FIGS. 6A-6F the temperature limit subsystem 52G is illustrated with considerably greater functional detail. A fuel reference is generated by the NHC hybrid interface card 112G as indicated by the reference character 115G. Fast and normal raise and lower pushbuttons 212G, 214G, 216G and 218G in box 100G on the operator panel function through RAISE AND and OR blocks 213G and 215G and LOWER AND and OR blocks 217G and 219G to apply inputs to the NHC card 112G which enable the fuel reference to be raised or lowered in the operator analog and manual modes. The normal raise and lower pushbutton signals are also applied to AND blocks 221G and 223G to set a normal ramp through the NHC analog clock for as long as the pushbutton is depressed. Similarly, fast raise and lower signals generate a fast ramp through AND block 225G and OR block 227G. Switches 229G and 231G are operated to generate the normal and fast ramp control signals. In the automatic mode, the computer 58G applies signals to the NHC card 112G to generate the output fuel reference from the NHC card 112G.

The automatic mode is selected by a pushbutton 220G if a computer READY signal is received from the NHC card 112G. The system functions in the manual or operator analog mode if a manual pushbutton 222G is pushed or if the computer rejects to manual as indicated by boxes 224G and 226G. Generally, the NHC card 112G responds to the automatic and manual mode signals to interface the manual mode control loops with the automatic mode control loops and to couple these loops with continuously functioning downstream control loops and the downstream fuel valve control.

In the temperature limit control loop, the combustor shell pressure sensor (FIG. 6D) is coupled to a proportional function generator 80G which is provided with a gain adjuster 75G, and the output of the block 80G is summed with a base load temperature setting signal from block 77G in a summer 82G. In addition, a switch 84G controls the application of an input blade path temperature reference peak bias signal from block 79G to the input of the summer 82G. The combustor shell pressure signal is also applied to the input of the startup function generator 78G and a switch 88G determines whether the startup temperature limit signal from the function generator 78G or the load temperature limit signal from the summer 82G is applied to the comparators 72G and 74G (FIG. 6F).

Figure 6A:
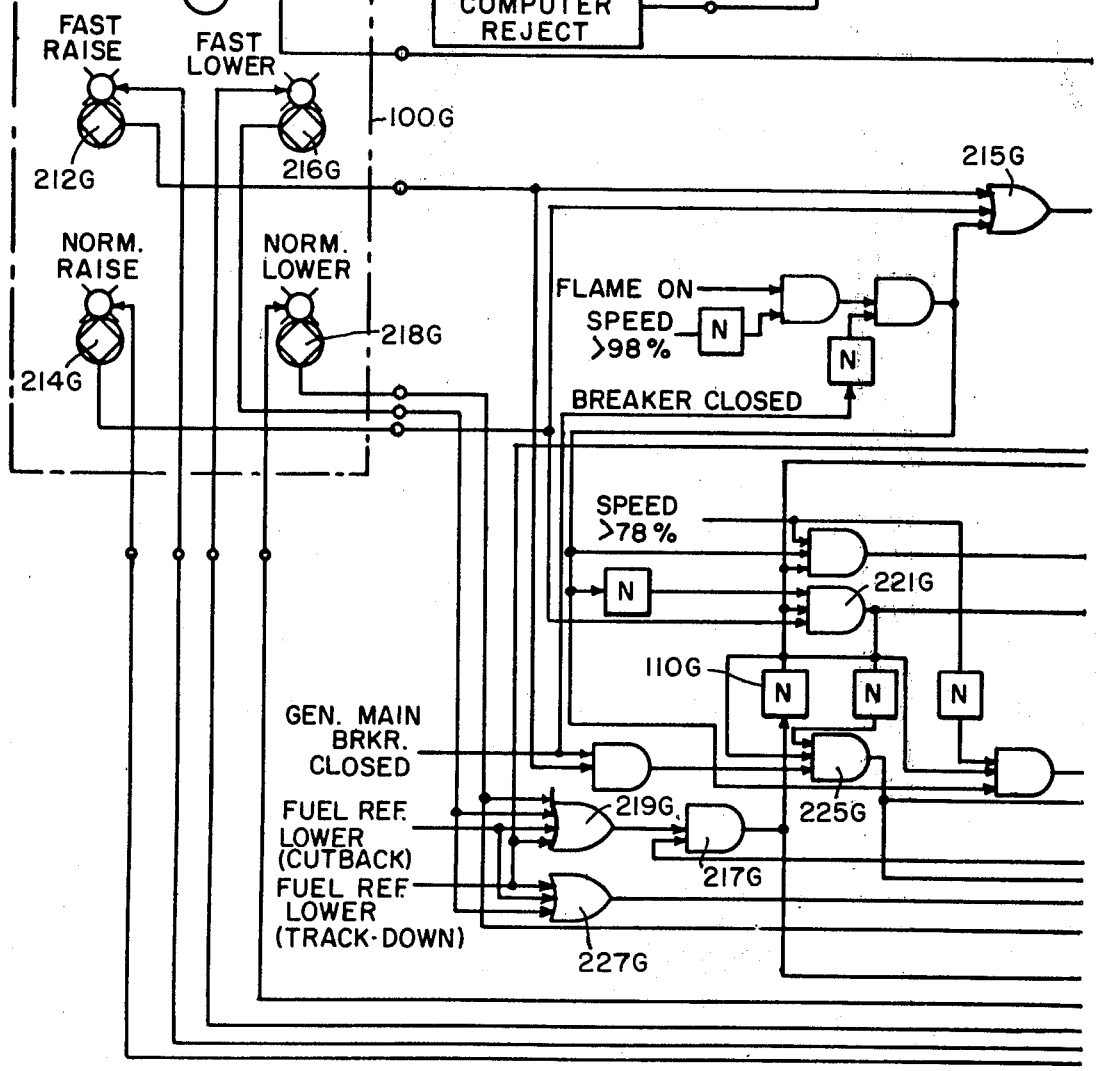
Figure 6B:
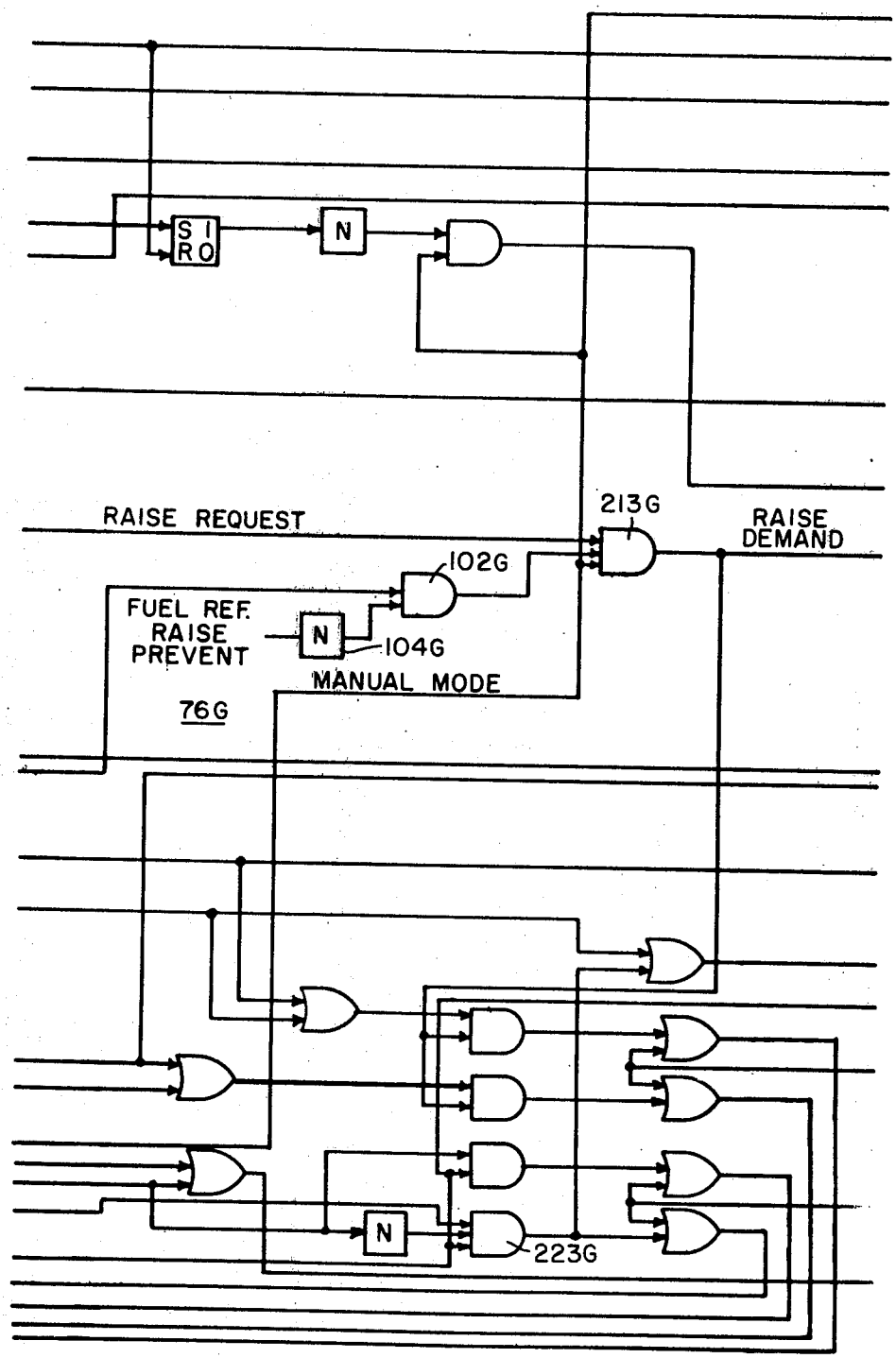
Figure 6C:
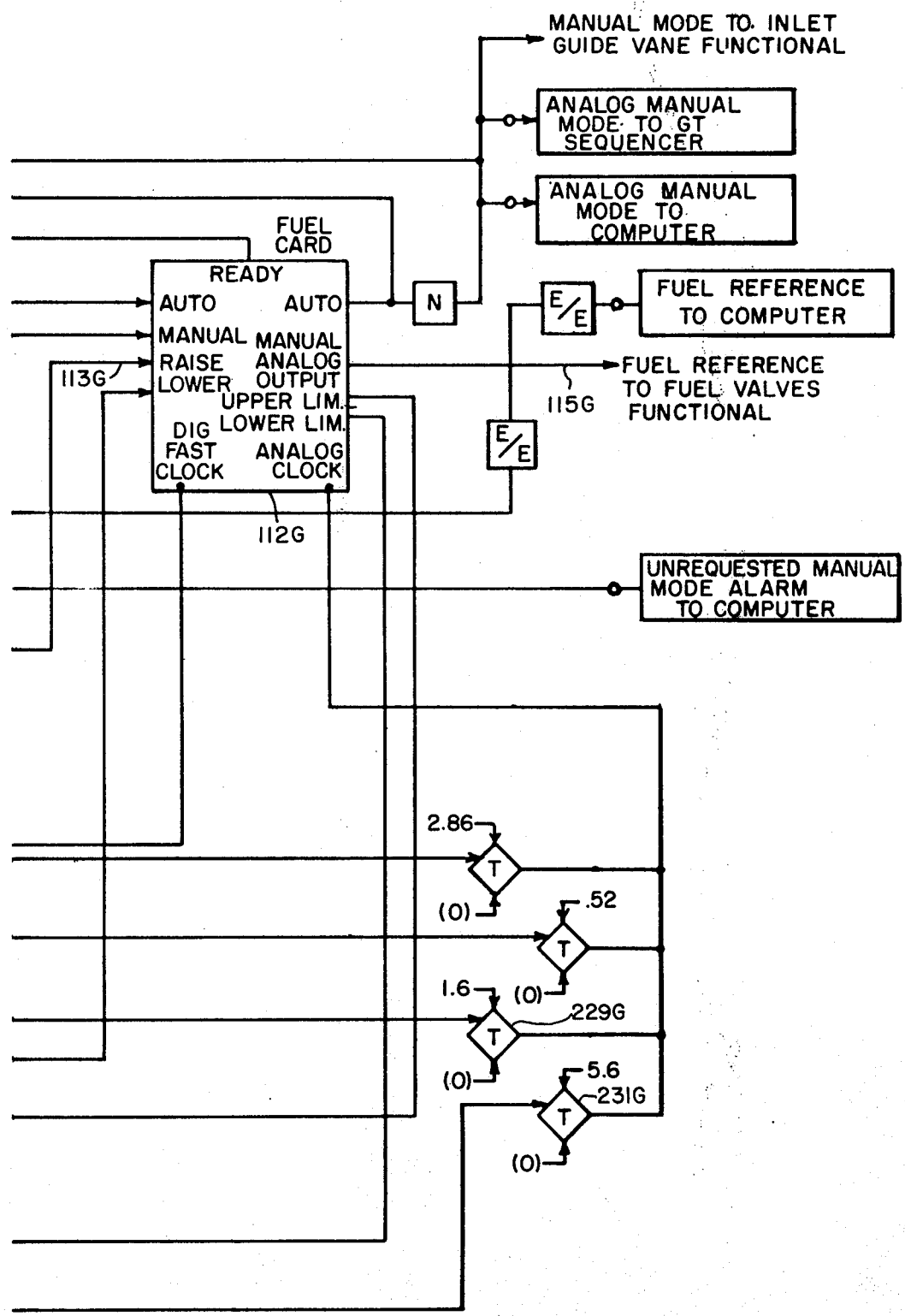
Figure 6D:
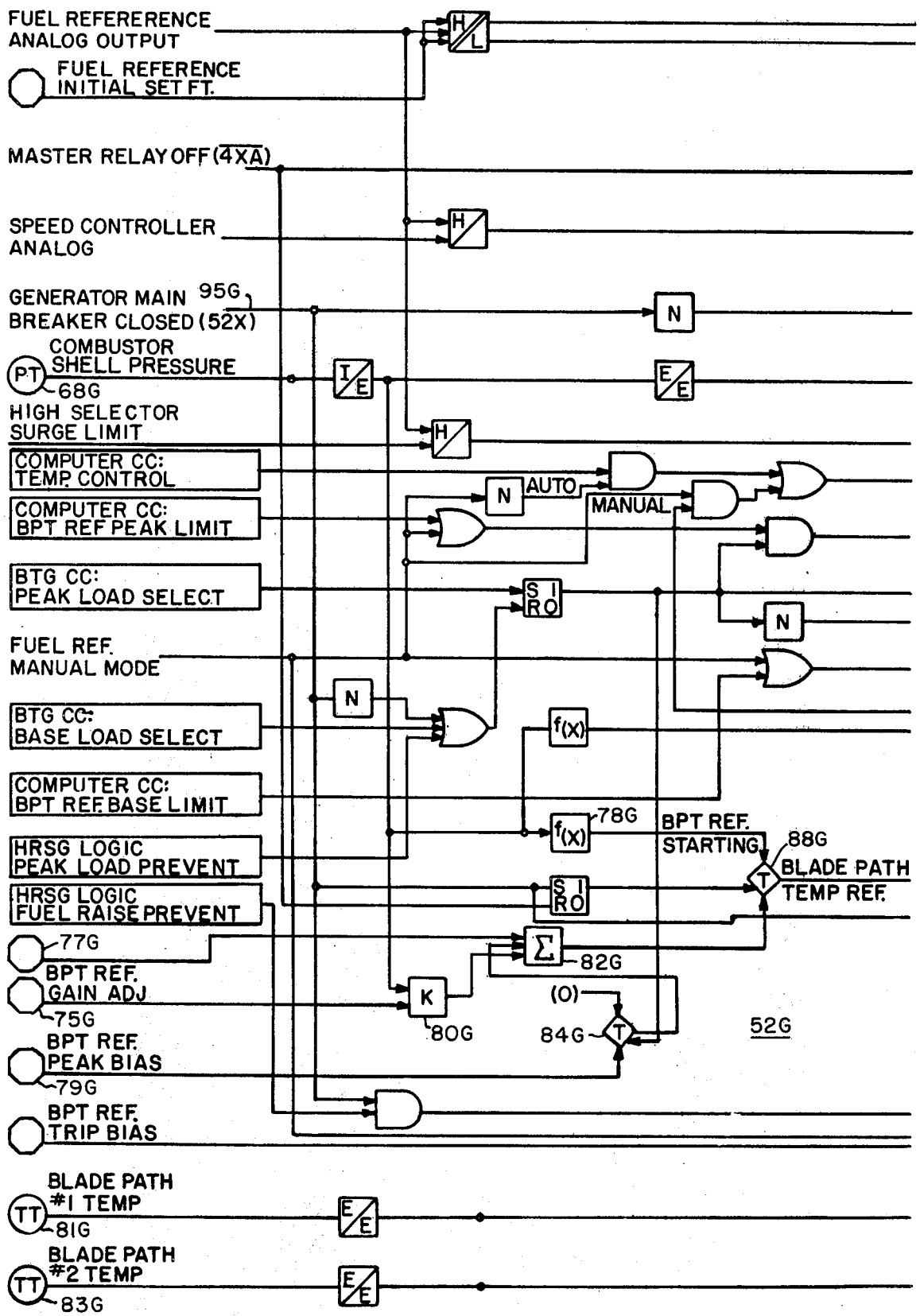
Figure 6E:
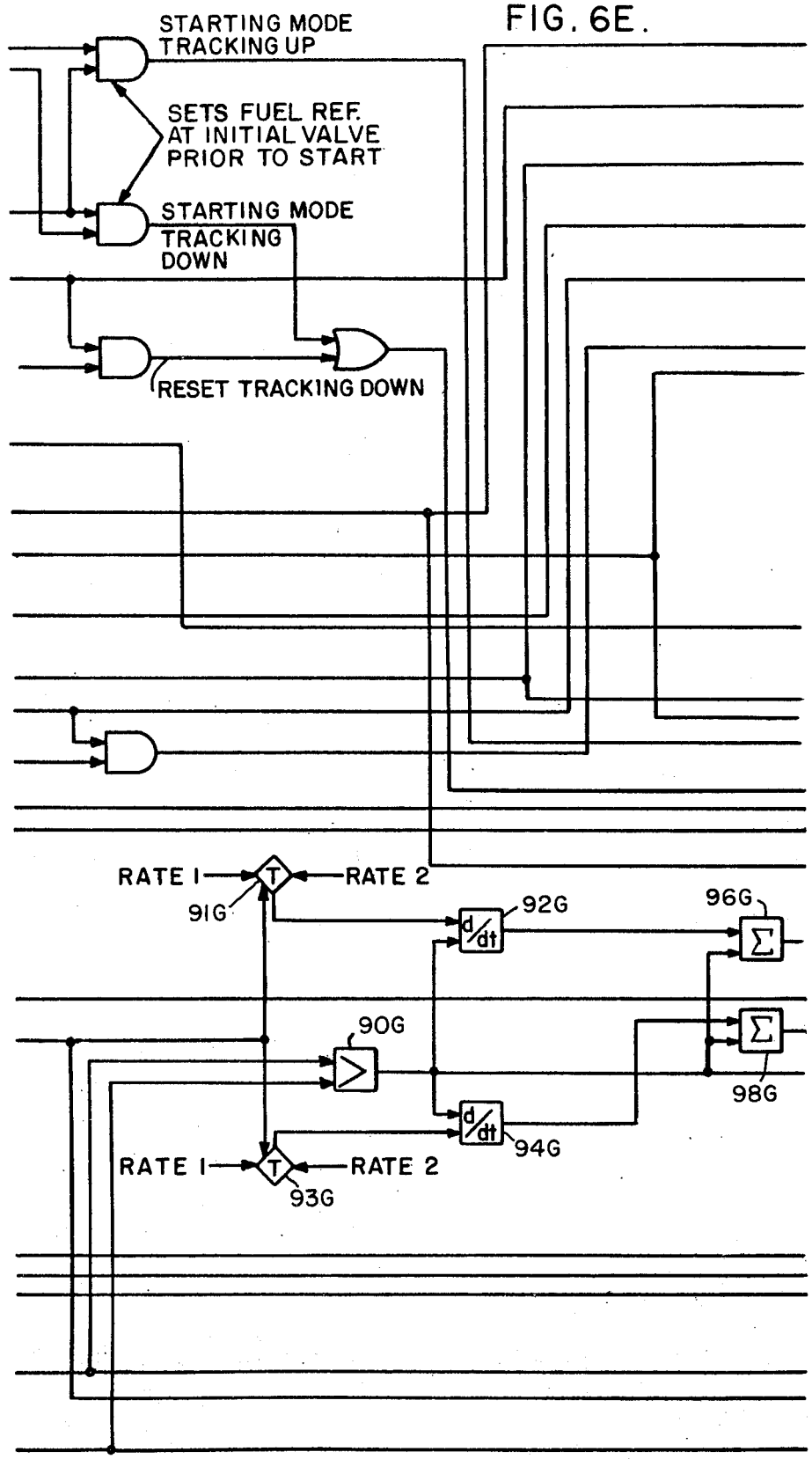
Figure 6F:
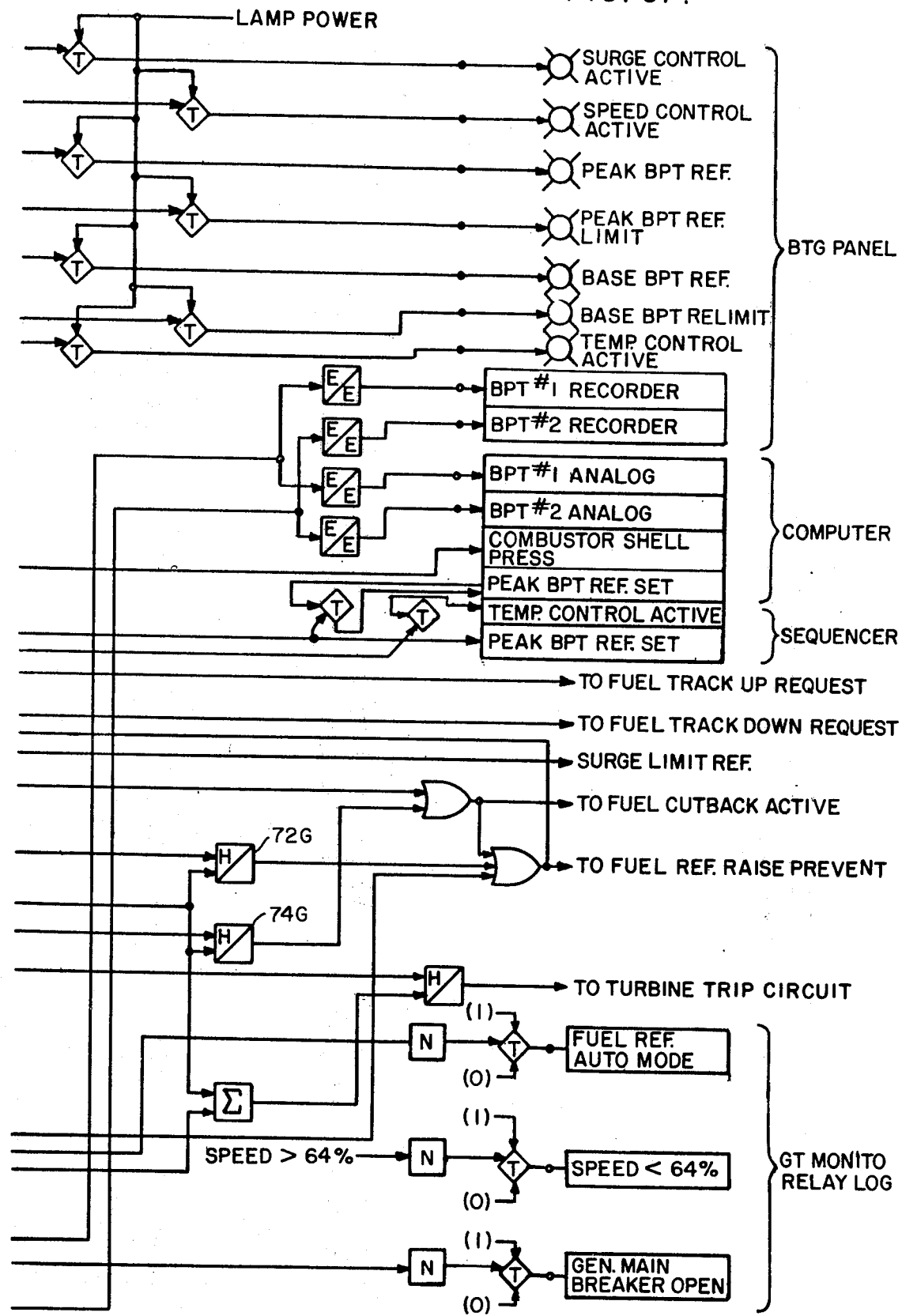

A pair of averaged blade path temperature signals from blocks 81G and 83G are passed through signal conditioners to the high select block 90G (FIG. 6E). The high temperature signal is then applied to the rate blocks 92G and 94G for development of the hold and cutback signals for comparison to the applicable temperature limit reference. The derivative values in the hold and cutback rate blocks 92G and 94G are different from each other as previously indicated, and further the derivative value in each rate block 92G or 94G is preferably controlled by switches 91G and 93G respectively to be one value under startup conditions and another value under load conditions.

A breaker closure input 95G operates the switches 91G and 93G to determine the operative derivative value in the blocks 92G and 94G. With breaker closure, the turbine is placed in the load mode of operation and the operative derivative values in the box 92G and 94G are relatively decreased from the operative values for dynamic startup conditions. In this manner, the system is optimized in its response characteristics to the different operating conditions in the startup and load modes.

The temperature limit logic 76G includes an AND block 102G (FIG. 6B) which responds to a hold signal from the comparator 72G through a NOT block 104G when a fuel reference LOWER demand is not operative. A cutback signal from the comparator 74G is passed through the OR block 219G (FIG. 6A) to generate a cutback demand from AND block 217G if the system is in the manual mode. A NOT block 110G processes the output of the AND block 217G to generate the negative LOWER signal applied to the input of the hold AND block 102G. The output of the cutback block 217G is also coupled to display logic, and it is coupled directly to the NHC hybrid interface card 112G (FIG. 6C) as indicated by the reference character 113G. To effect a hold action, the fuel reference raise input to the NHC card 112G from the AND block 213G is negated when a raise request is operative from the operator panel 54G and when a fuel reference hold signal has been generated at the input of the NOT block 104G to make the output of the AND block 102G a logic zero.

Once the gas turbine control is switched or rejected to the backup mode, the temperature limit loop has no effect on the fuel reference as long as the high selected characterized blade path temperature signal is less than the temperature limit reference. When the characterized feedback temperature signal equals or exceeds the reference temperature limit value, the hold signal or the cutback signal forces a hold or cutback in the manually controlled fuel reference which is applied from the NHC card 112G to the electropneumatic controls for the gas turbine throttle valve in the block 57G in FIG. 4. The temperature limit control action accordingly functions on a logical on-off basis and is especially adjustable to embodiment with integrated circuit or other kinds of digital devices.

DIGITAL/ANALOG HYBRID COUPLER (NHC) CARD

Figure 8:
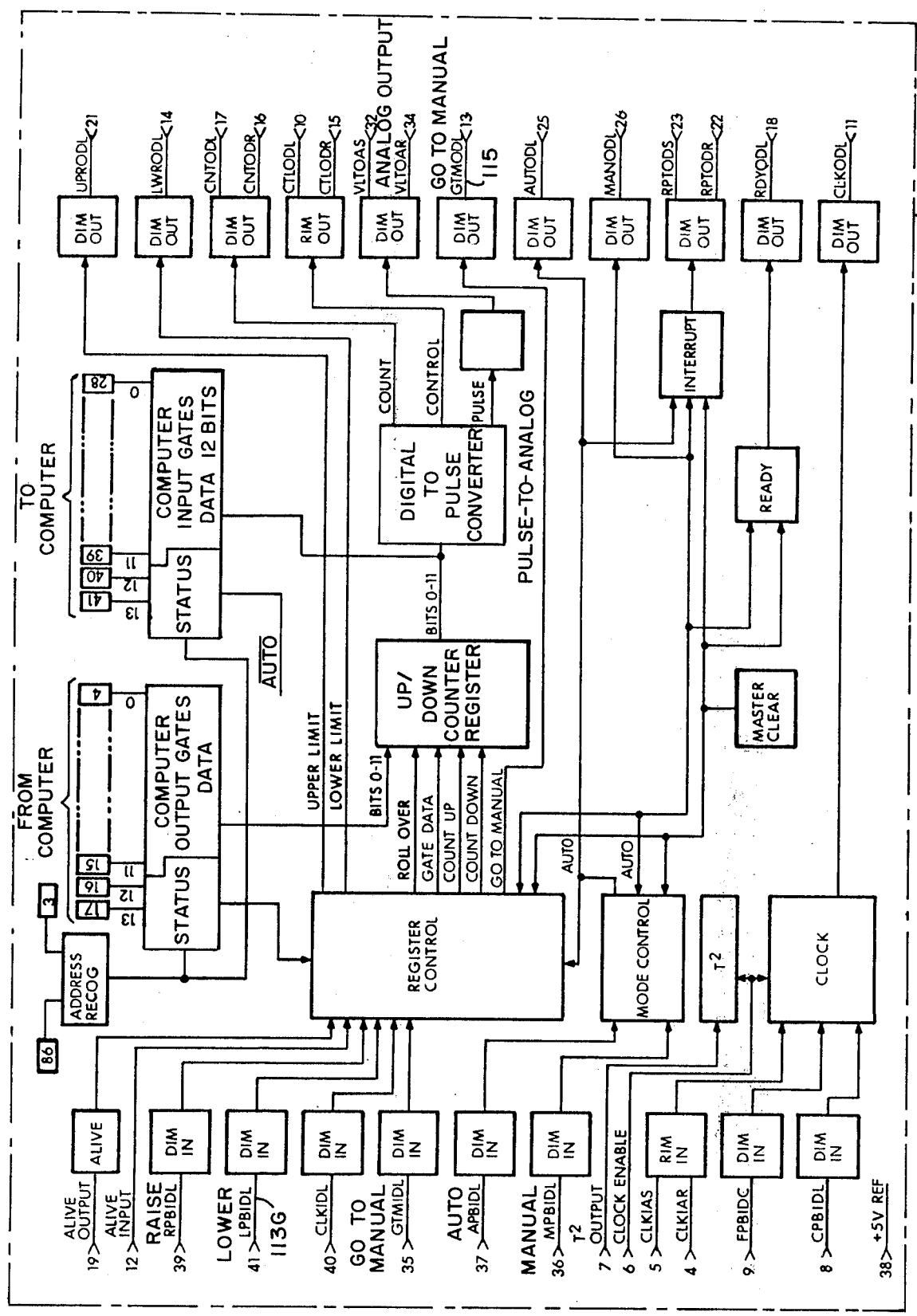
FIG. 8 shows a schematic diagram of a circuit card which provides a hydrid interface between the digital computer circuitry and the analog circuitry employed in the gas turbine control system.

As shown in greater detail in FIG. 8, the fuel reference raise and lower signals are applied to the input of an NHC register control which causes an up/down counter register to count up or count down according to whether a raise demand or lower demand is in effect. On hold operation, an operator raise request is defeated, and on a cutback operation or a track down operation, a fuel reference lower demand is generated at the input of the register control to cause the register to count down. The register output is converted to pulses which in turn are converted to an analog output for application as fuel reference to the fuel valve control as indicated by the reference character 115G.

An NHC card (FIG. 8) converts a 12 bit binary number from the computer to an analog signal. This card operates in either the manual or the automatic mode. In the automatic mode, the NHC card output can be set or read by a computer peripheral channel. In the manual mode, the NHC card output is controlled by signals generated outside the computer which raise or lower the output.

In automatic operation, if the computer does not update the NHC card within a set time period, the card is set to the manual mode by an alive circuit. The alive circuit has a timing device which can be set for 1, 5, or 20 seconds. The time period is selectable by resistor and capacitor values.

In manual operation, clock pulses determine the rate of change of the analog output signal. The clock pulses may be generated by either an external or an internal clock.

Automatic Operation

The computer uses a 14 bit word to send and receive data and status. When the address recognition circuit senses that the computer is addressing the NHC card, it gates the data and status bits through the output gates. The status bits are routed to the register control and the data bits are routed to the up/down counter. The status bits are decoded and appropriate action is taken. The output of the up/down counter (which contains the last word from the computer) is converted to a pulse train by the digital/pulse converter. The pulse train is then converted to an analog signal. The output of the up/down counter and the status bits are routed to the input gates and sent to the computer.

Manual Operation

In the manual mode, the count in the up/down counter is regulated by external raise (RPBIDL) and lower (LPBIDL)) signals generated either by pushbuttons from a manual/ automatic control station or by logic circuitry. The clock will increment or decrement the counter as long as the raise or lower signal is present. Roll over is inhibited; that is, the up/down counter cannot count past 4095 or below 0. The clock rate, which is adjustable by analog control, i.e. by means of a variable voltage at pins 4 and 5, determines the amount of time it takes to change the signal level. When the raise or lower signal goes low, i.e. logical zero, the count in the up/down counter is held; thus, the analog output signal remains constant at that level. The D/A register consists of a set of binary up/down counters which accept parallel data and act as latches in the Automatic mode. In Manual mode the operator (or external logic) has control of the counters and can count them up or down. The raise/lower logic and the clock control this process. The raise and lower inputs control which direction the counters move. The counting rate is determined by the clock. If both raise and lower are enabled simultaneously the counters will do nothing.

Manual/Auto Transfer

If forced to Manual mode, the analog output signal remains unchanged at its last value until increased or decreased manually; thus, the transfer is bumpless. The external interrupt alerts the computer to a change in the card's operating mode. It is activated when the card goes from Auto to Manual or from Manual to Auto for any reason. A manual to auto transfer may be initiated only by the operator depressing the "Auto" pushbutton. The card will remain in Manual mode if any internal or external "Go To Manual" signal exists. A "Ready" output indicates that the card is in Manual mode and that no "Go To Manual" signal is present. The card can be forced to Manual by a "Go To Manual" signal. An internal "Go To Manual" is generated by the computer outputting a "Go To Manual" status, by either a "Raise" or "Lower" input, or by the Keep Alive circuit. After an Auto to Manual transition, the last number set in the D/A register by the computer remains until changed by the operator.

SYSTEM CIRCUITRY

In FIGS. 7A–7F, there is shown circuitry preferably employed to implement functions described in connection with FIGS. 6A–6F. The combustor shell pressure signal is applied to a signal conditioner card 116G (FIG. 7A) which applies an output to an inverter amplifier 118G. It is noted that the combustor shell pressure signal at the input of the inverter 118G is also applied to the analog input system associated with the digital computer.

The inverter output is applied to the input of an amplifier card 120G which operates at a function generator for the startup temperature limit reference signal. The output from the card 120G is applied to hold and cutback comparator cards 122G and 124G (FIG. 7C) by normally closed relay contacts 126G. A relay 128G operates the contacts 126G to an open state when the generator breaker is closed as determined by the operation of logic circuitry 130G.

The output from the inverter 118G is also applied to the input of the load function generator 132G (FIG. 7B and 7C) as indicated by the reference character 121G. The load function generator 132G includes a potentiometer 136G and a proportional amplifier card 138G. The output of the load function generator 132G is applied as an input to the hold and cutback comparators 122G and 124G through a normally open relay contact 140G of the relay 128G. The load function generator output signal operates as a temperature limit reference during base load and peak load operation. The peak load function is offset to a higher value from the base load function by means of the application of a peak load bias through relay contact 142G or relay 144G. The contact closure outputs from the operator panel as indicated by the reference characters 146G and 148G (FIG. 7A) control the relays 128G and 164G.

The blade path temperature signals from blocks 81G and 83G are applied to circuit cards 150 and 152G which function as a high selector to generate at the output of the card 152G the highest blade path temperature feedback signal on line 154G. The high selected temperature feedback signal is applied to an inverter 156G and the inverter output is applied to rate amplifier cards 158G and 160G having adjustable rate action and disposed respectively in the fuel reference cutback control channel and the fuel reference hold control channel. Further, the high selected temperature signal is applied to the input of a summing amplifier card 161G in the fuel reference cutback channel and to the input of a summing amplifier card 162G in the fuel reference hold channel.

The output of the rate amplifier 158G is also applied to the input of the fuel reference cutback summing amplifier 161G and the output of the rate amplifier 160G is also applied to the input of the fuel reference hold summing amplifier 162G. In turn, the output of the cutback summing amplifier 161G is applied to the input of the cutback comparator 124G for comparison to the applicable temperature limit reference and the output of the hold summing amplifier 162G is applied to the input of the hold comparator 122G for comparison to the applicable temperature limit reference. A fuel cutback signal or a fuel hold signal is generated only when the temperature limit reference is exceeded by the output of the cutback summing amplifier 161G or the output of the hold summing amplifier 162G.

In manual or operator analog mode operation, the operator can freely request a raise in the fuel reference until it approaches the point where the feedback turbine blade path temperature plus the rate at which the feedback temperature is changing forces a hold in the fuel reference. Once the blade path temperature change rate diminishes as a result of the hold, an additional request can be made for additional increase in the fuel reference since the sum of the feedback temperature and rate of change of temperature will then have dropped below the temperature limit reference. As the blade path temperature continues to increase toward the limit, a hold may again be placed on the fuel reference. This process continues until the high selected blade path temperature feedback signal equals the temperature limit reference at which time a steady hold action occurs. The operator accordingly can inch the gas turbine toward its temperature limit state of operation and in so doing the combined cycle plant is allowed to operate without excessive swings in the boiler and steam turbine operation.

Figure 7B:
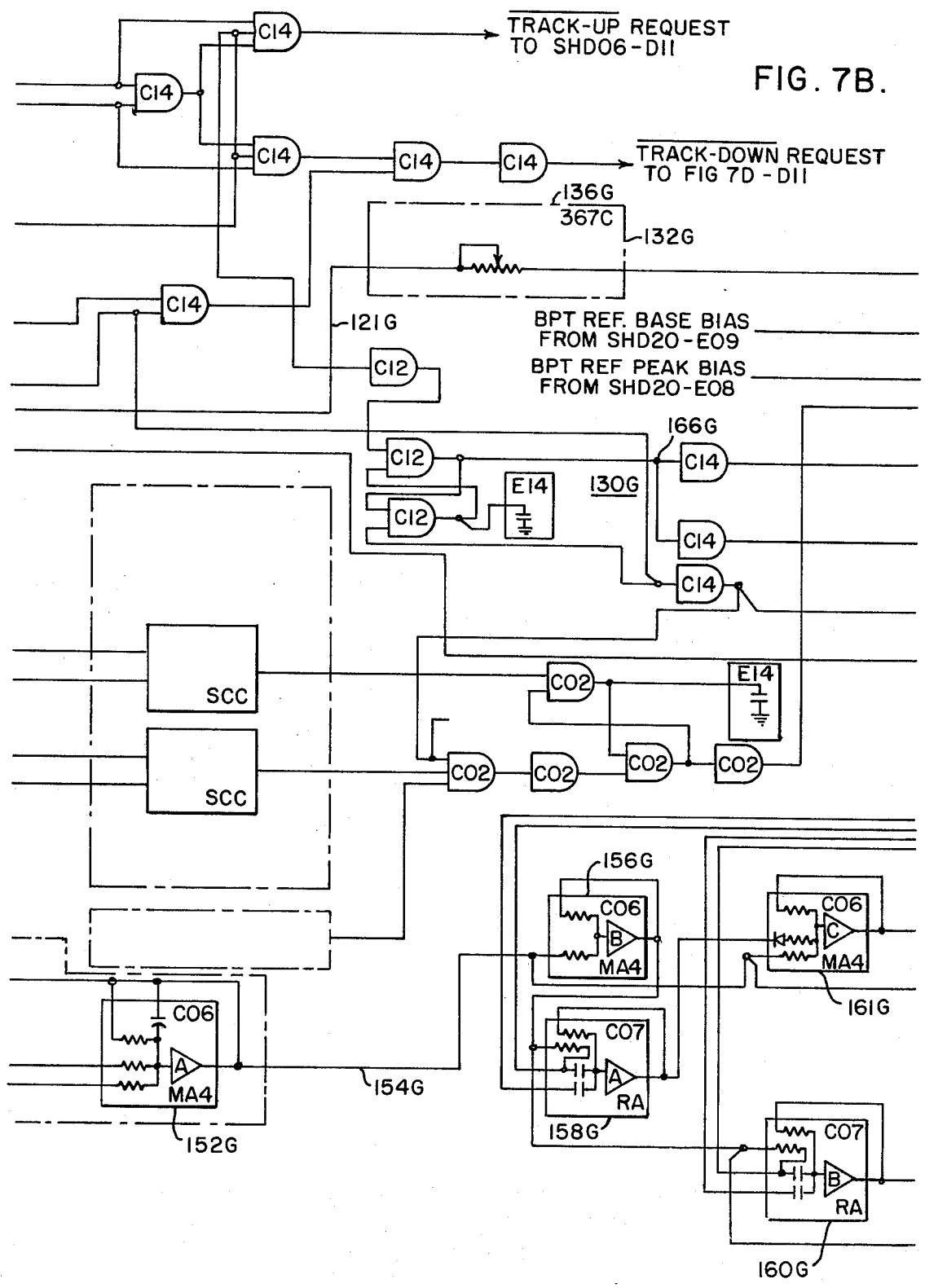
Figure 7C:
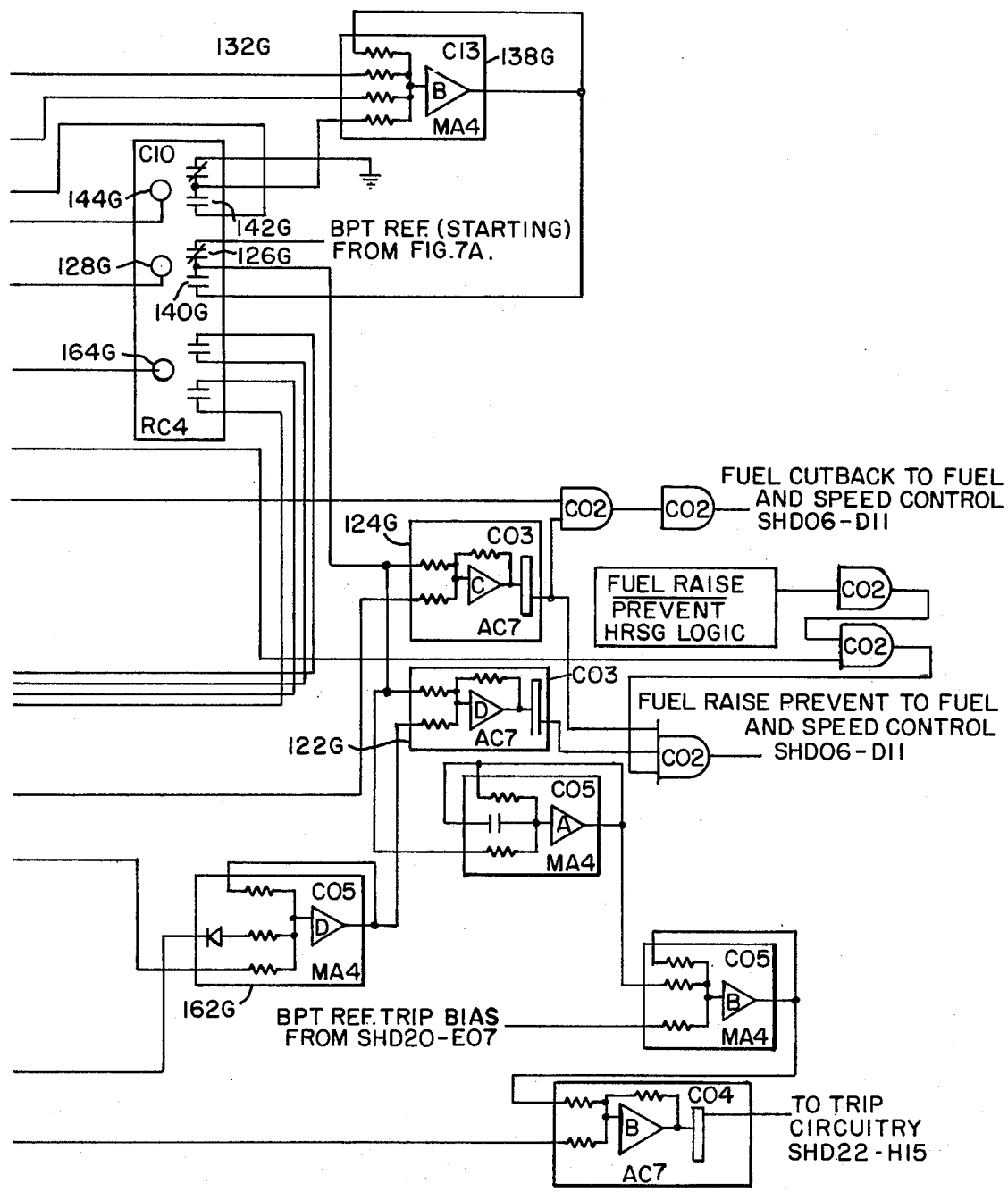
Figure 7D:
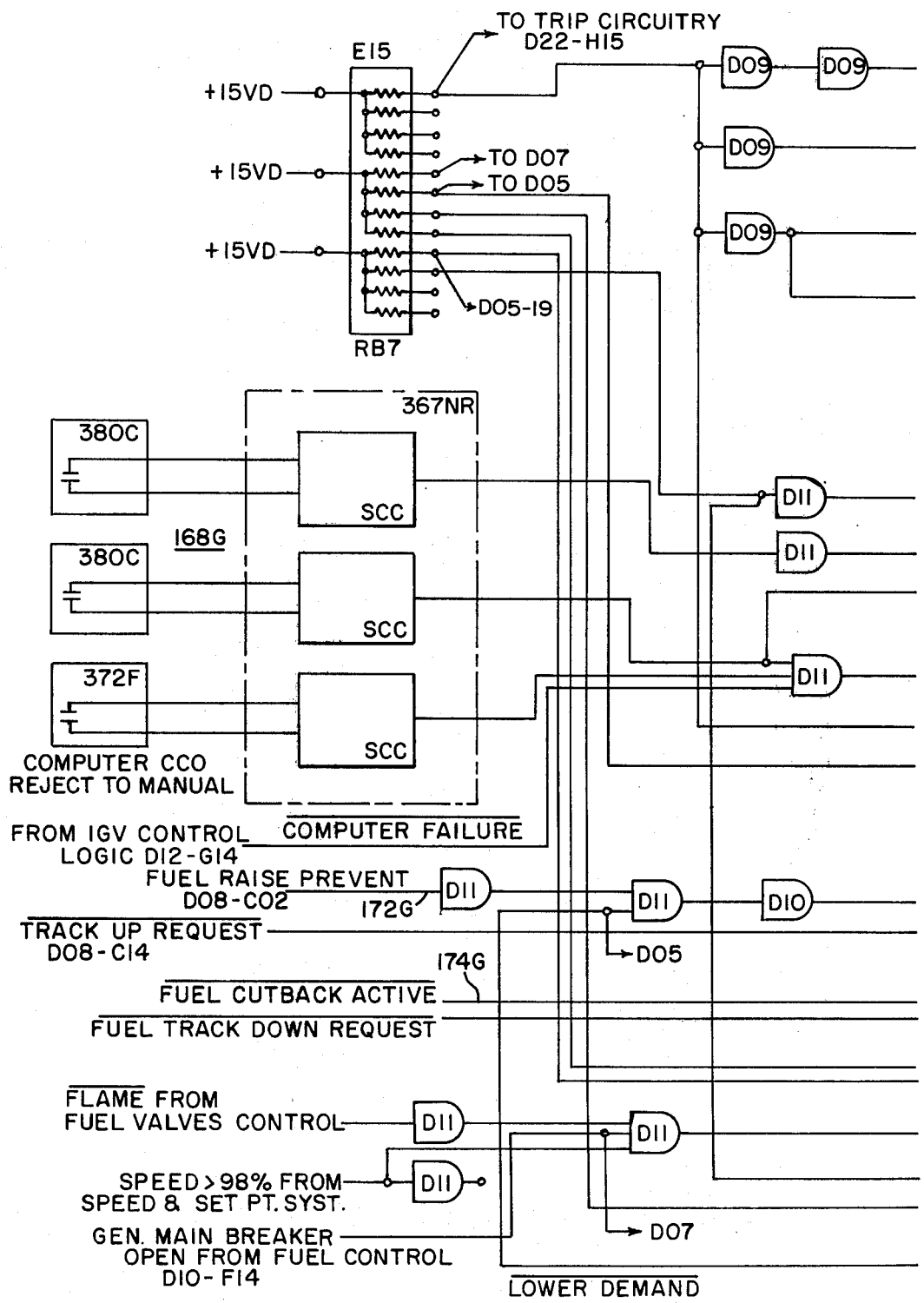
Figure 7E:
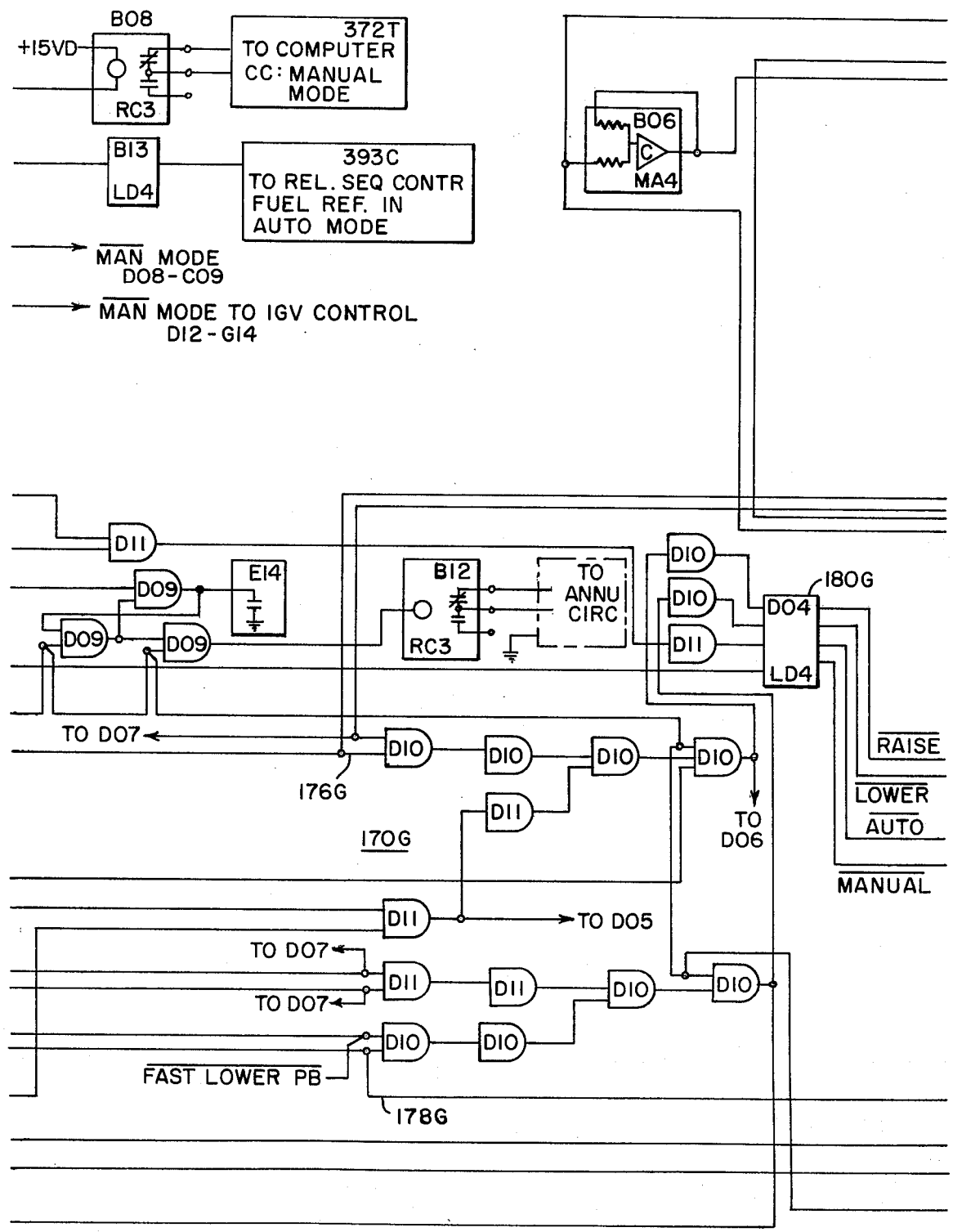
Figure 7F:
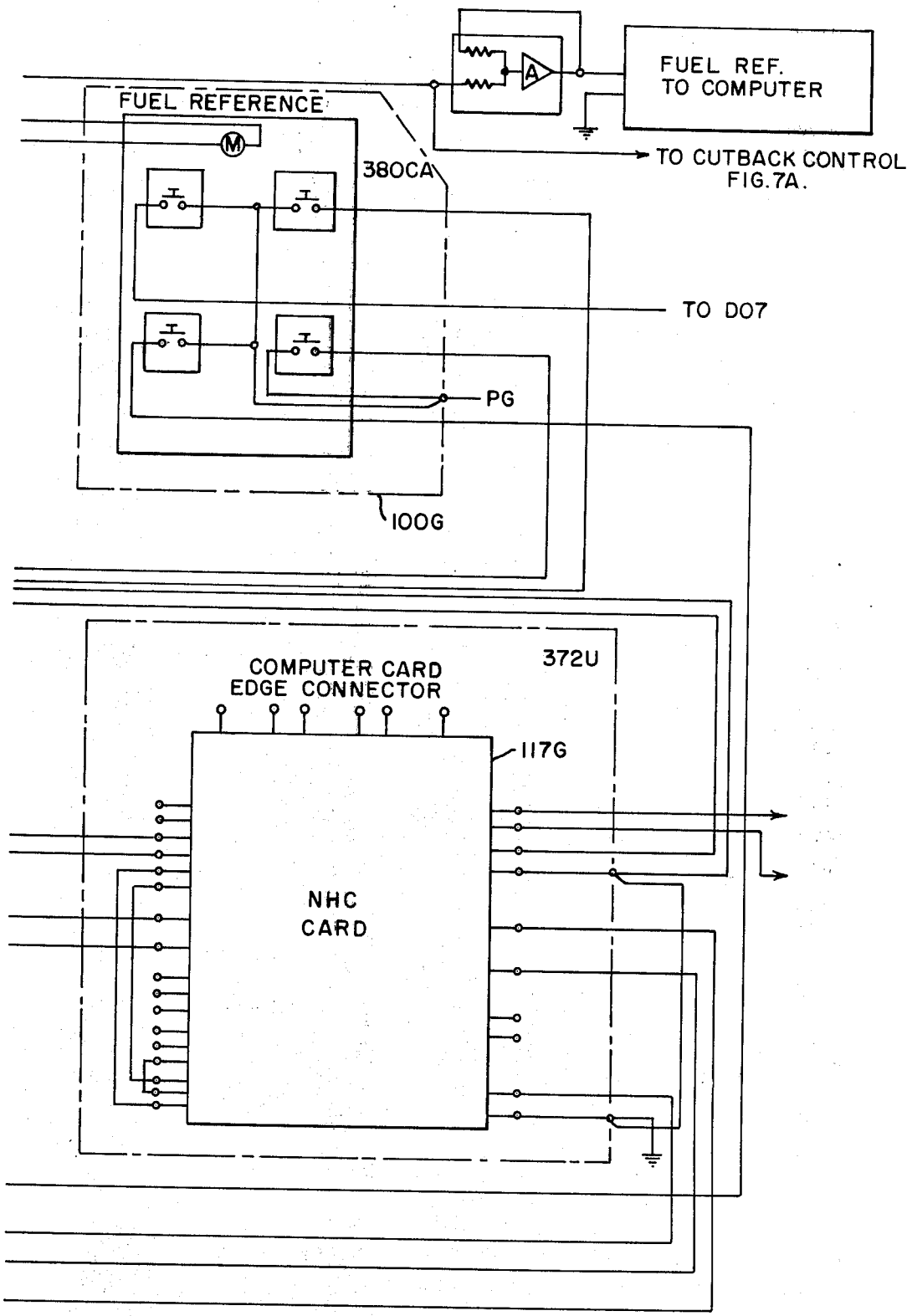

If the feedback blade path temperature and the rate of change of that temperature becomes too high, the fuel reference cutback channel, i.e. the comparator 124G, the summer amplifier 161G and the rate amplifier 158G, come into operation and lowers the fuel reference. Automatic temperature limit control lowering of the fuel reference to keep the turbine outlet temperature withing prescribed limits may result from excessive operator load demand, from excessive analog startup fuel demand or from increases in ambient temperature at a given fuel demand. To provide different derivative values for the rate amplifiers 158G and 160G during startup and loading operation, a relay 164G operates contacts in circuit relationship with inputs of the rate amplifiers 158G and 160G. The relay 164G functions in response to the same signal which operates the limit reference selection relay 128G as indicated by the reference 166G (FIG. 7B).

Automatic/manual selection circuitry is also shown as indicated by the reference character 168G. Such circuitry controls whether the temperature limit control subsystem is in operation or out of operation according to whether the control system is in the manual mode or the automatic mode. Logic circuitry 170G is provided to process the fuel raise hold signal and the fuel cutback signal indicated by reference characters 172G and 174G respectively. The logic circuitry 170G also interfaces the temperature limit control subsystem with raise and lower signals from the panel section 100G, i.e. as indicated by the reference character 176G for a raise request and the reference character 178G for a lower request. The logic circuitry 170G is coupled to the hybrid NHC card 117G through lines 180G which apply logic signals as designated in the drawing.

What is claimed is:

1. A combined cycle electric power plant comprising at least one gas turbine, means for generating steam in response to heat energy from said gas turbine, a steam turbine driven by steam supplied to it from said steam generating means, means for generating electric power under the driving power of said turbines, means for controlling the operation of said turbines and said steam generating means, said controlling means including a gas turbine control system having an automatic control and a backup control, said gas turbine control system including means for controlling the flow of fuel to said gas turbine under automatic and backup control, said automatic control means including means for limiting the flow of fuel to limit the outlet gas temperature to a reference value during the automatic mode of operation, means for transferring between said automatic and backup controls under predetermined conditions, said backup control including means for manually raising and lowering a fuel demand signal applied to said fuel control means at least to control gas turbine load during the load mode of operation, and means for overriding the backup control when necessary to control said fuel controlling means at least to prevent fuel flow increases and thereby to limit the turbine outlet gas temperature to a reference value during the backup mode of operation.

2. A combined cycle electric power plant as set forth in claim 1 wherein said overriding temperature limit means includes means for generating at least one signal representative of the turbine blade path or exhaust temperature, means are provided for controlling said fuel controlling means to hold the fuel flow against increasing under a first gas temperature condition, and means are provided for controlling said fuel controlling means to cut back the fuel flow under a second and more restrictive temperature condition to prevent excessive steam generator and steam turbine temperature cycling.

3. A combined cycle electric power plant as set forth in claim 1 wherein said overriding temperature limit means includes means for generating a signal representative of combustor shell pressure, means are provided for generating a temperature limit reference signal as a function of the combustor shell pressure signal, means are provided for generating at least one signal representative of the turbine blade path or exhaust temperature, and means are provided for combining the temperature and temperature limit reference signal to initiate the temperature limit override action on backup control.

4. A combined cycle electric power plant as set forth in claim 3 wherein said temperature limit reference generating means includes means for generating a temperature limit reference as a first predetermined function of combustor shell pressure during gas turbine startup operation and as a second predetermined function of combustor shell pressure during gas turbine load operation.

5. A combined cycle electric power plant as set forth in claim 4 wherein the second predetermined function is defined by a first linear slope for base load operation and a second linear slope at a higher temperature offset value during peak load operation.

6. A combined cycle electric power plant as set forth in claim 3 wherein said temperature signal generating means generates a feedback temperature signal corresponding to gas temperature, means are provided for generating one derivative of the feedback temperature signal at one derivative value and for generating another derivative signal of the feedback temperature signal at another and higher derivative value, means are provided for combining the feedback temperature signal and the one derivative signal to generate a cutback channel signal, means are provided for combining the feedback temperature signal and the other and higher derivative signal to generate a hold channel signal, and means are provided for combining the temperature limit reference signal and the hold and cutback channel signals to override the backup control with a fuel hold signal or a fuel cutback signal according to the difference between the temperature limit reference and the feedback temperature and according to the rate of change of the feedback temperature so as to prevent excessive steam generator and the steam turbine temperature cycling.

7. A combined cycle electric power plant as set forth in claim 1 wherein said automatic control includes a digital computer, a hybrid interface circuit is provided for coupling said fuel controlling means with said automatic and backup controls, said transferring means includes means for selectively placing said gas turbine under automatic and backup control and for rejecting from computer automatic control to backup control under predetermined conditions, and means are provided for detecting when the backup control is operative to activate said temperature limit override control means.

8. A combined cycle electric power plant as set forth in claim 7 wherein said manual raising and lowering means include means for generating raise and lower signals for application to said interface circuit, said temperature limit override control means includes means for generating an override signal, and a logic circuit is provided for uncoupling the raise and lower signals from said fuel controlling means and for coupling the override control signal to said fuel controlling means.

9. A gas turbine electric power plant comprising a compressor section and a turbine section, a plurality of combustors for energizing the driving gas flow for the turbine section, means for generating electric power under the driving power of the turbine, a gas turbine control system having an automatic control and a backup control, means for controlling the flow of fuel to said turbine combustors under automatic and backup control, said automatic control means including means for limiting the flow of fuel to limit the outlet gas temperature to a reference value during the automatic mode of operation, means for transferring between said automatic and backup controls under predetermined conditions, said backup control including means for manually raising and lowering a fuel demand signal applied to said fuel control means at least to control gas turbine load during the load mode of operation, and means for overriding the backup control when necessary to control said fuel controlling means at least to prevent fuel flow increases and thereby to limit the turbine outlet gas temperature to a reference value during the backup mode of operation.

10. A gas turbine electric power plant as set forth in claim 9 wherein said overriding temperature limit means includes means for generating a signal representative of combustor shell pressure, means are provided for generating a temperature limit reference signal as a function of the combustor shell pressure signal, means are provided for generating at least one signal representative of the turbine blade path or exhaust temperature, and means are provided for combining the temperature and temperature limit reference signals to initiate the temperature limit override action on manual control.

11. A gas turbine electric power plant as set forth in claim 10 wherein said temperature limit reference generating means includes means for generating a temperature limit reference as a first predetermined function of combustor shell pressure during gas turbine startup operation and as a second predetermined function of combustor shell pressure during gas turbine load operation.

12. A gas turbine electric power plant as set forth in claim 10 wherein said temperature signal generating means generates a feedback temperature signal corresponding to gas temperature, means are provided for generating one derivative of the feedback temperature signal at one derivative value and for generating another derivative signal at another and higher derivative value, means are provided for combining the feedback temperature signal and the one derivative signal to generate a cutback channel signal, means are provided for combining the feedback temperature signal and the other and higher derivative signal to generate a hold channel signal, and means are provided for combining the temperature limit reference signal and the hold and cutback channel signals to override the backup control with a fuel hold signal or a fuel cutback signal according to the difference between the temperature limit reference and the feedback temperature and according to the rate of change of the feedback temperature so as to prevent excessive steam generator and the steam turbine temperature cycling.

13. A gas turbine electric power plant as set forth in claim 8 wherein said automatic control includes a digital computer, a hybrid interface circuit is provided for coupling said fuel controlling means into said automatic and backup controls, said transferring means includes means for selectively placing said gas turbine under automatic and backup control and for rejecting from computer automatic control to backup control under predetermined conditions, and means are provided for detecting when the backup control is operative to activate said temperature limit override control means.

14. A control system for an electric power plant gas turbine comprising an automatic control and a backup control, means for controlling the flow of fuel to said gas turbine under automatic and backup control, said automatic control means including means for limiting the flow of fuel to limit the outlet gas temperature to a reference value during the automatic mode of operation, means for transferring between automatic and backup controls under predetermined conditions, said backup control including means for manually raising and lowering a fuel demand signal applied to said fuel control means at least to control gas turbine load during the load mode of operation, and means for overriding the backup control when necessary to control said fuel controlling means at least to prevent fuel flow increases and thereby to limit the turbine outlet gas temperature to a reference value during the backup mode of operation.

15. A control system as set forth in claim 14 wherein said overriding temperature limit means includes means for generating a signal representative of combustor shell pressure, means are provided for generating a temperature limit reference signal as a function of the combustor shell pressure signal, means are provided for generating at least one signal representative of the turbine blade path or exhaust temperature, and means are provided for combining the temperature and temperature limit reference signal to initiate the temperature limit override action on manual control.

16. A control system as set forth in claim 15 wherein said temperature limit reference generating means includes means for generating a temperature limit reference as a first predetermined function of combustor shell pressure during gas turbine startup operation and as a second predetermined function of combustor shell pressure during gas turbine load operation.

17. A control system as set forth in claim 15 wherein the second predetermined function is defined by a first linear slope for base load operation and a second linear slope at a higher temperature offset value during peak load operation.

18. A control system as set forth in claim 14 wherein said automatic control includes a digital computer, a hybrid interface circuit is provided for coupling said fuel controlling means into said automatic and backup controls, said transferring means includes means for selectively placing said gas turbine under automatic and backup control and for rejecting from computer automatic control to backup control under predetermined conditions, and means are provided for detecting when the backup control is operative to activate said temperature limit override control means.

19. A control system as set forth in claim 18 wherein said manual raising and lowering means includes means for generating raise and lower signals for application to said interface circuit, said temperature limit override control means includes means for generating an override signal, and a logic circuit is provided for uncoupling the raise and lower signals from said fuel controlling means and for coupling the override control signal to said fuel controlling means.

20. A combined cycle power plant as set forth in claim 1 wherein said automatic control includes a programmed digital computer.

21. A control system as set forth in claim 14 wherein said automatic control includes a programmed digital computer.

22. A control system as set forth in claim 18 wherein said combining means compares the two temperature signals and generates a logic signal for override initiation when the temperature signal equals or exceeds the temperature limit reference signal.

23. A control system as set forth in claim 18 wherein said overriding temperature limit means includes means for generating a signal representative of combustor shell pressure, means are provided for generating a temperature limit reference signal as a function of the combustor shell pressure signal, means are provided for generating at least one signal representative of the turbine blade path or exhaust temperature, and means are provided for comparing the two temperature signals and for generating a logic signal for override initiation when the temperature signal equals or exceeds the temperature limit reference signal, and means for coupling said comparison means to said hybrid interface circuit to implement the override action.

\* \* \* \* \*